US008850060B1

(12) United States Patent
Beloussov et al.

(10) Patent No.: US 8,850,060 B1
(45) Date of Patent: *Sep. 30, 2014

(54) NETWORK INTERFACE WITHIN A DESIGNATED VIRTUAL EXECUTION ENVIRONMENT (VEE)

(75) Inventors: Serguei M. Beloussov, Singapore (SG); Stanislav S. Protassov, Moscow (RU); Alexander G. Tormasov, Moscow (RU)

(73) Assignee: Acronis International GmbH, Schaffhausen (CH)

( * ) Notice: Subject to any disclaimer, the term of this patent is extended or adjusted under 35 U.S.C. 154(b) by 1166 days.

This patent is subject to a terminal disclaimer.

(21) Appl. No.: 12/359,353

(22) Filed: Jan. 26, 2009

Related U.S. Application Data

(63) Continuation-in-part of application No. 11/556,233, filed on Nov. 3, 2006, which is a continuation-in-part of application No. 10/826,280, filed on Apr. 19, 2004, now Pat. No. 7,698,400.

(51) Int. Cl.
*G06F 15/16* (2006.01)
*H04L 29/06* (2006.01)

(52) U.S. Cl.
CPC ........ *H04L 63/1408* (2013.01); *H04L 63/0227* (2013.01)
USPC .................... 709/235; 726/11; 726/24; 718/1

(58) Field of Classification Search
CPC ..... G06F 21/56; G06F 9/5072; H04L 67/306; H04L 41/28; H04L 61/1408; H04L 29/06578
USPC ............................ 709/235; 726/11, 24; 718/1
See application file for complete search history.

(56) References Cited

U.S. PATENT DOCUMENTS

| 6,061,349 | A | * | 5/2000 | Coile et al. ..................... 370/389 |
|---|---|---|---|---|
| 6,571,245 | B2 | * | 5/2003 | Huang et al. ........................... 1/1 |
| 6,763,501 | B1 | * | 7/2004 | Zhu et al. ....................... 715/234 |
| 6,990,591 | B1 | * | 1/2006 | Pearson .......................... 726/22 |
| 7,188,369 | B2 | * | 3/2007 | Ho et al. .......................... 726/24 |
| 7,725,531 | B1 | * | 5/2010 | Sood et al. ..................... 709/203 |
| 8,074,276 | B1 | * | 12/2011 | Beloussov et al. .............. 726/22 |
| 8,707,417 | B1 | * | 4/2014 | Liang et al. ..................... 726/11 |
| 2005/0216759 | A1 | * | 9/2005 | Rothman et al. .............. 713/200 |
| 2006/0053486 | A1 | * | 3/2006 | Wesinger et al. ............... 726/15 |
| 2006/0090136 | A1 | * | 4/2006 | Miller et al. ................... 715/734 |
| 2007/0198656 | A1 | * | 8/2007 | Mazzaferri et al. ........... 709/218 |
| 2011/0274110 | A1 | * | 11/2011 | Mmmadi et al. .............. 370/392 |

OTHER PUBLICATIONS

Page, Xen Networking, May 2006, http://web.archive.org/web/20060616195414/http://wiki.xensource.com/xenwiki/XenNetworking.*

(Continued)

*Primary Examiner* — Joseph E Avellino
*Assistant Examiner* — James Conaway
(74) *Attorney, Agent, or Firm* — Bardmesser Law Group

(57) ABSTRACT

A system and method for managing network traffic provided to users includes a computer system and an operating system running on the computer system. A plurality of Virtual Execution Environments (VEEs) are executed on the computer system. Each VEE provides a set of services to remote users. A one or more designated VEE(s) provide network traffic handling services to other VEEs based on the needs of the remote users of the particular VEEs. The network traffic processing services are provided via a virtual network adapter(s) implemented within the designated VEE(s). The network traffic handling services are controlled and administered by each of the VEEs via control means of the designated VEE(s).

20 Claims, 17 Drawing Sheets

(56) References Cited

OTHER PUBLICATIONS

Lowe, Use Bitfrost to manage an iptables firewall, Jun. 27, 2002 http://articles.techrepublic.com.com/5100-10878_11-1047998.html.*

Warfield et al., Isolation of Shared Network Resources in Xenoservers, Nov. 2002.*

SWSoft, Plesk Expand User's Guide, Oct. 1, 2005, http://web.archive.org/web/20051001050204/download1.sw-soft.com/Plesk/Expand/rel111/docs/expand-user-guide.pdf.*

SWSoft, Virtuozzo Basics, Jan. 2005, http://web.archive.org/web/20050101010438/www.sw-soft.com/en/virtuozzo/enterprise/basics/.*

Enomalism.com, Enomalism Virtualized Management Dashboard, Jan. 2007, http://replay.waybackmachine.org/20070108111305/http://enomalism.com/Wiki.wiki%2BM5b4d50e48da.0.html.*

Matthews et al., Running Xen: A Hands-On Guide to the Art of Virtualization, Apr. 6, 2008, Prentice Hall ISBN-10: 0-13-234966-3.*

Xen Team, Xen User's Manual, 2004.*

Enomaly, Enomalism—Xen Wiki, Dec. 12, 2007, http://wiki.xensource.com/xenwiki/Enomalism.*

* cited by examiner

NETWORK INTERFACE WITHIN A DESIGNATED VIRTUAL EXECUTION ENVIRONMENT (VEE)

CROSS-REFERENCE TO RELATED APPLICATIONS

This application is a continuation in part of U.S. patent application Ser. No. 11/556,233, filed on Nov. 3, 2006, entitled METHOD AND SYSTEM FOR ADMINISTRATION OF SECURITY SERVICES WITHIN A VIRTUAL EXECUTION ENVIRONMENT (VEE) INFRASTRUCTURE, which is a continuation-in part of U.S. patent application Ser. No. 10/826,280, filed on Apr. 19, 2004, entitled DEDICATION OF ADMINISTRATIVE SERVERS TO MANAGEMENT OF SERVER FUNCTIONS IN A MULTI-SERVER ENVIRONMENT and is related to U.S. patent application Ser. No. 11/673,585, filed Feb. 11, 2007, entitled SYSTEM AND METHOD FOR USING VIRTUAL MACHINE FOR DRIVER INSTALLATION SANDBOX which are all incorporated by reference herein in their entirety.

BACKGROUND OF THE INVENTION

1. Field of the Invention

The present invention relates to data management within a virtual execution environment (VEE), and more particularly, to dedication of one or more VEEs for serving as a network interface for remote users.

2. Background Art

Network administration services for computer systems are typically implemented by network interfaces located on the edge of a local area network (LAN). The network administration includes security services provided for all of the computer systems "behind" a firewall. Another typical implementation of network administration services is to have a network interface having security application, such as anti-virus or spam filtering, executed on each of the computer systems.

Computer systems, such as those that run server processes, typically have a set of services (sometimes called "daemons") that are used for servicing user requests and operating system requests. These services can be dedicated to servicing requests from external anonymous users, for example, a WWW service or an anonymous FTP service. They can also be used for servicing requests from authorized users, such as FTP service and email service POP3/IMAP4 (Post Office Protocol 3/Internet Message Access Protocol (version 4)).

For management (administration) of the network services, typically a system administrator is necessary, who can enter appropriate operating system commands, and who can monitor the state of the operating system and the services. A particular example of a system administrator is an operator, who is typically allowed only a highly restricted subset of functions—for example, checking server statistics, management of print queues, etc.

The cost of a system administrator for the owner of such a system (e.g., a data center) is often a substantial part of the total cost of ownership (TCO). Easing the burden on such a system operator and enabling a substantial commonality of his activities is an important issue in software development for data center administration.

The job of an administrator, as it relates to administrative services, often includes not just direct commands to the computer system for performance of specific actions, but also involves certain "indirect" operations. Examples of such indirect operations include assurance of an appropriate level of security, verification of system state, backing up data and creation of backup databases, provision of new servers and services, load balancing, etc. Attempts to ease the burden on the operator for providing such functions take several forms.

For example, the use of Virtual Private Servers (VPSs) allows at least some commonality among the various server processes running within the computer system, and also allows commonality in their instantiation and configuration. Usually VPSs are installed with mass administration tools, for example, Virtuozzo™ VPS (available from SWsoft, Inc., www.swsoft.com) has a set of special scripts, command line and Graphical User Interface utilities for such a purpose.

The problem of administration of a large set of services and servers for many users is widely known, especially to administrators of web hosting companies and data centers. Each routine operation often requires expensive manual operations, and, when handling thousands of users even on single hardware box with a single operating system, each simple operation, which should be performed hundreds and thousands of times, becomes very expensive. Unification and simplification of mass operations therefore can result in a significant economical benefit.

Another ever-present problem is assuring a level of safety and security of the services provided to the users. For example, authentication of users and user login verification has to occur within a safe environment. Any failures and crashes of services for one user should not affect services for other users, and should not affect overall system security.

The concept of a so-called "sandbox" is one conventional solution. For example, in the UNIX environment, it is common to place the FTP services for anonymous users within a "sand box." In that case, even if an intruder manages to gain access to that particular server and "breaks it," then his malicious activities still occur within the sand box (a secure environment), and the intruder cannot gain access to any critical system data in this fashion.

Additionally, there may be issues with execution of non-standard operations. One type of such non-standard operations is "dangerous" operations that can result in an unpredictable state of the system. Examples include remote services reboot and remote firewall configuration operation. In the case of remote services reboot, should that process fail to reboot and reinitialize the appropriate server process properly, the only recourse available to an administrator of that particular process (for example, to a remote VPS administrator) is to request expensive manual intervention from the system administrator. In the case of remote firewall configuration, the person configuring the firewall could accidentally mis-configure it in such a manner that even the administrator or operator of such a firewall is himself blocked from any further access through the firewall. This results in a server process or a VPS, that is "empty," i.e., running "normally," but is in reality useless, because it is inaccessible.

Other non-standard operations include organization of services providing name-based hosting for web users, where a number of virtual web servers share the same IP address with a single logical instance of webserver. Other services include security services.

Accordingly, what is needed is a system and method for providing a more secure and more efficient mechanism for network traffic processing services in a multi-server environment.

SUMMARY OF THE INVENTION

The present invention relates to method, system and computer program product for data management within a Virtual Execution Environment (VEE), and more particularly, to dedication of one or more VEEs for serving as a network interface for remote user, that substantially obviates one or more of the disadvantages of the related art.

According to one embodiment, a system and method for management of network traffic (i.e., packetized) data within a VEE includes a computer system and an operating system running on the computer system. A plurality of VEEs is implemented on the computer system or on a plurality of remote computer systems or on the computer cluster.

Each VEE provides a set of services to remote users. A designated VEE serves as a network interface (i.e. network adapter) that provides network traffic data management services to the remote users of the particular VEEs. The network traffic data management services provided by the designated VEE can include packet filtering, packet routing, traffic monitoring etc. The security services can be also controlled through the designated VEE by each of the VEEs requesting a particular service.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE FIGURES

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

The following definitions are generally used throughout this description:

VEE—Virtual Execution Environment, a type of environment that supports program code execution, where at least a part of the real hardware and software required for running program code are presented as their virtual analogs. From the point of view of the user, the code in VEE runs as if it were running on the real computing system.

VE—Virtual Environment, for example a Virtual Private Server (VPS), is one type of a Virtual Execution Environment (VEE) running on the same hardware system with a shared OS kernel and most of the system resources, where isolation of Virtual Execution Environments is implemented on the namespace level. A Virtual Private Server (VPS) is a closed set, or collection, of processes, system resources, users, groups of users, objects and data structures. Each VPS has its own ID, or some other identifier, that distinguishes it from other VPSs.

The VPS offers to its users a service that is functionally substantially equivalent to a standalone server with remote access. From the perspective of an administrator of the VPS, the VPS should preferably act the same as a dedicated computer at a data center. For example, it is desirable for the administrator of the VPS to have the same remote access to the server through the Internet, the same ability to reload the server, load system and application software, authorize VPS users, establish disk space quotas of the users and user groups, support storage area networks (SANs), set up and configure network connections and webservers, etc. In other words, the full range of system administrator functions is desirable, as if the VPS were a dedicated remote server, with the existence of the VPS being transparent from the perspective of both the VPS user and the VPS administrator.

VM—Virtual Machine, a type of an isolated Virtual Execution Environments running on the same physical machine simultaneously. Each Virtual Machine instance executes its own OS kernel. Support of Virtual Machines is implemented using a Virtual Machine Monitor and/or a Hypervisor.

Hypervisor—control software having the highest privilege level for administrating hardware computer resources and Virtual Machines.

A VEE, according to an exemplary embodiment, can be any of a Virtual Private Server, a Virtual Machine, a Hypervisor-based Virtual Machine, and a Lightweight Hypervisor-based Virtual Machine, a session of Terminal Server Windows 2003 (or older) and a session of Citrix Presentation Server, Lightweight Hypervisor-based Virtual Machines, VMM-based VMs or hypervisor-based VMs.

Figure 1:
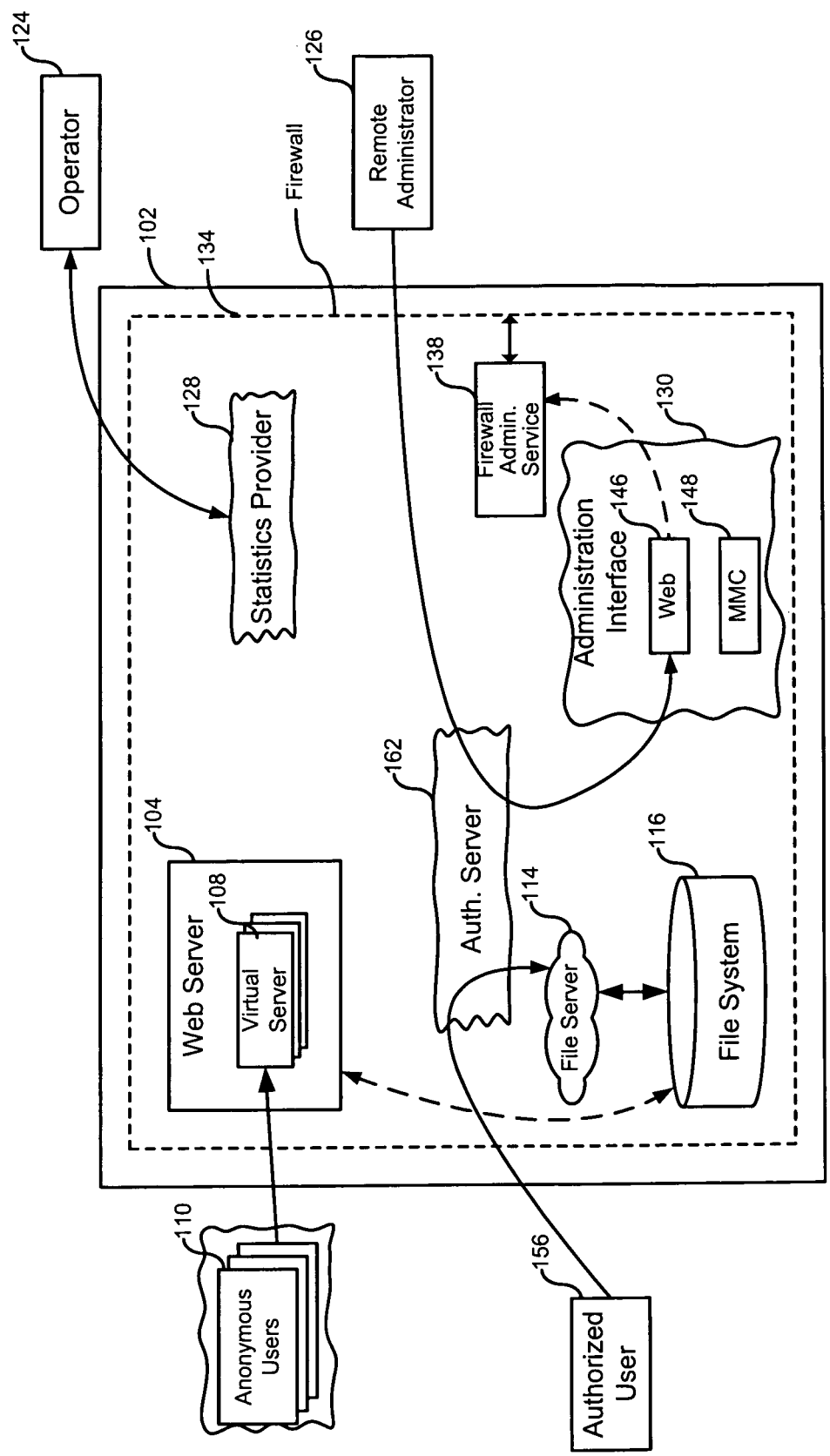
FIG. 1 illustrates an architecture of a computer system with a built-in firewall.

FIG. 1 illustrates an architecture of an exemplary computer system 102 with an optional built-in firewall 134. If the firewall 134 is present, all contact with external entities occurs through the firewall 134. The computer system 102 may have a server process running, such as a webserver 104 (or a number of such webservers 104). The webserver 104 may have a number of virtual servers 108 running within it. The virtual servers 108 may interface to anonymous external users 110. Here, anonymous users 110 are, for example, users accessing a web page on the virtual server 108 by clicking on a link in their browser (in other words, without mandatory registration or a log-in of any kind as a user of the system 102).

The computer system 102 also may include some form of a statistics provider module 128, which may be accessible by an operator 124. The statistics provider module 128 is normally used to gather resource usage and other performance/utilization statistics for the various processes/services that run within the computer system 102.

An authorization server 162 is used to authorize users 156 and remote administrators 126. The authorization server 162 can be used by a file server 114, which interfaces with a file system 116. An example of an authorized user 156 is a user that needs to download certain files from the file system 116 using an FTP protocol.

The computer system 102 also includes the administration interface 130, which is used by the remote administrator 126 to manage the operations of, for example, the authorization server 162 or the firewall 134. The administration interface may include, for example, a web interface 146 of the administrative system. It may also include a Microsoft Management Console (MMC) 148 or other interfaces. These interfaces 146, 148 enable the remote administrator 126 to manage appropriate computer services. Example of such a service is a firewall administrative service 138 that manages the settings of the firewall 134, and may be controlled by the remote administrator 126 through the administration interface 130.

Note that the operator 124 is often a person whose job it is to continually monitor the state of the computer system 102 (or a number of such computer systems).

Figure 2:
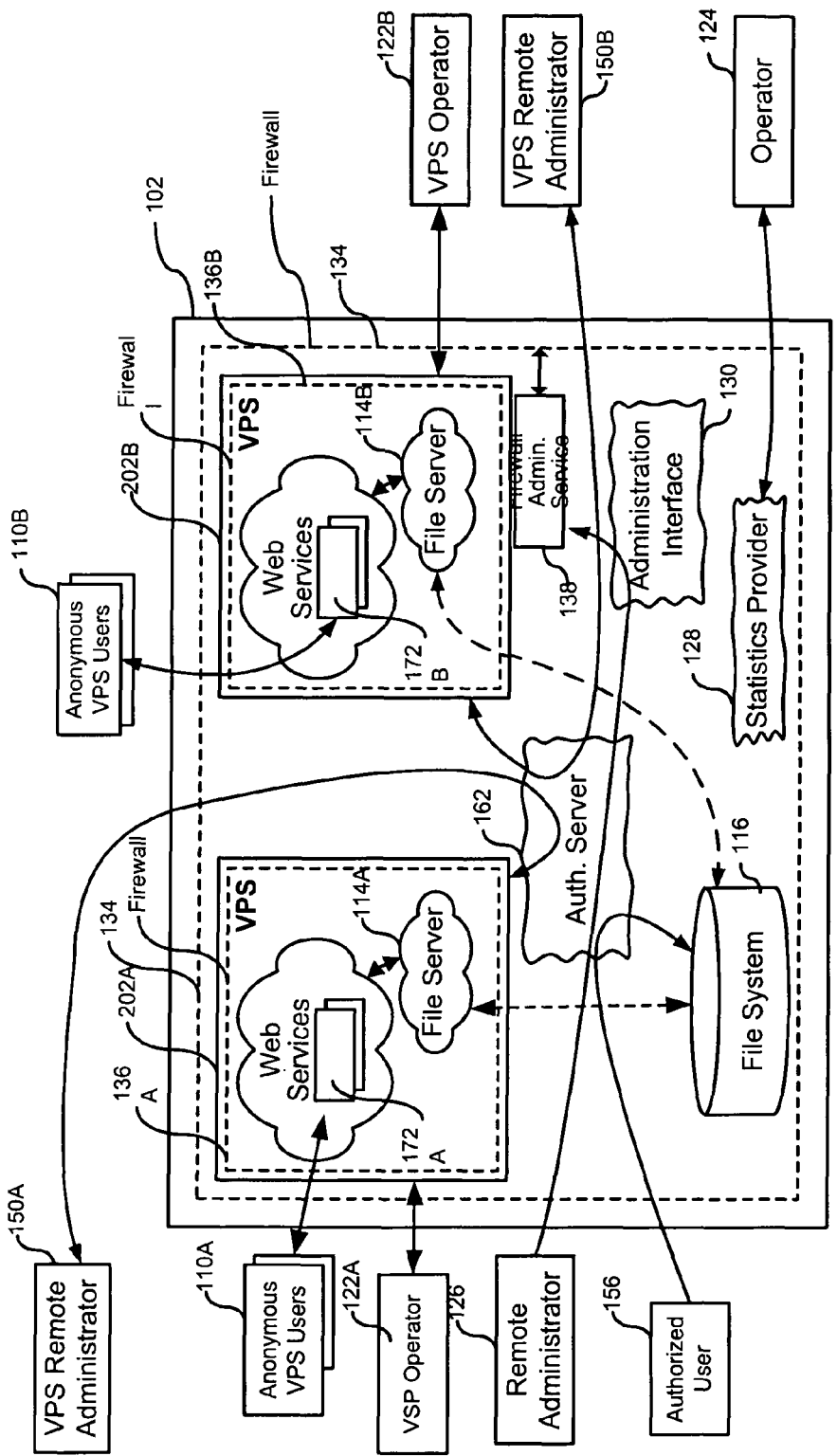
FIG. 2 illustrates a variation on FIG. 1 in the context of Virtual Private Servers (VPSs)

FIG. 2 illustrates a variation on FIG. 1, particularly in the context of Virtual Private Servers (VEs), examples of which are also described in co-pending commonly assigned U.S. patent application Ser. No. 10/703,594, filed on Nov. 10, 2003, entitled VIRTUAL PRIVATE SERVER WITH ISOLATION OF SYSTEM COMPONENTS, which is incorporated by reference herein in its entirety. In FIG. 2, the webserver 104 of FIG. 1 has been replaced by a number of server processes, such as Virtual Private Servers (VPSs) 202A, 202B, etc. Each such Virtual Private Server 202 has its own corresponding remote administrator 150A, 150B, which are typically authorized through the authorization server 162 (or can use their own authorization service). Each VPS 202A, 202B has corresponding anonymous VPS users 110A, 110B, which access web services 172A, 172B through optional firewalls 136A, 136B of each individual VPS 202A, 202B. Each VPS 202A, 202B optionally can have its own file server 114A, 114B, which interfaces to the file system 116 and to respective web services 172A, 172B of the VPSs 202A, 202B. Each VPS 202A, 202B is operated by its corresponding VPS operator 122A, 122B (if any).

Each computer system can have one or more sets of VPSs that are similar in implementation technology, with one or more of them being dedicated to administration purposes. Similarity may include a common way of numbering (or identifier creation for each VPS) and common implementation technology (e.g., VM-like, separation of namespaces as in Virtuozzo™, chroot/jail environments, logical grouping, etc.).

A VPS illustrated in FIG. 2 (for example, 202A) is an example of a server process, or group of services. Such a group of services may be, for example, web services 172A with or without other services. They can also be, for example, a file server, an FTP server, an authentication server, a chroot environment, a jail environment, a sand box environment (all discussed below), a print server or a Microsoft Windows Terminal Service. Other examples of a server process include POP3 servers, IMAP/IMAP4 servers, SMTP (Simple Mail Transfer Protocol) servers, web servers, resources scheduler servers, COM/COM+/DCOM (Component Object Model/extended COM/Distributed COM) servers, cryptographics servers, browser servers, DHCP (Dynamic Host Configuration Protocol) servers, Distributed file system servers, Distributed Link tracking servers, event log servers, reporting servers, DNS (domain name servers), file replicator servers, SSL (Secure Socket Layer) servers, indexing servers, firewall servers, Kerberos servers, IPSEC servers (PSEC is a protocol suite used for secure communication at a network layer between two peers), instant messaging servers, message write (messenger) servers, logon servers, Network DDE (Dynamic Data Exchange) servers, NLA (Network Location Awareness) servers, performance logs and alerts servers, plug and play servers, print spooler servers, protected storage servers, disk encryption servers, routing servers, remote access servers, security account manager servers, system event notification servers, telnet servers, telephony servers, uninterruptible power supply servers, virtual disk servers, Windows installer servers, Windows Management Instrumentation (WMI) wireless configuration servers, WMI performance adaptor servers, data base servers, Network address translation servers, RC (Internet Relay Chat) servers, chat servers, X windows servers, inetd servers, volume shadow copy servers, boot and remote boot servers, finger servers, secure shell (SSH) servers, who servers, rexec servers, webster servers, conference servers, Radius™ servers, zip servers, socks servers, afbackup servers, backup servers, ASP (Active Server Pages) servers, fido servers, WAP (Wireless Application Protocol) servers Plesk server™ (available from SWsoft, Inc.), Virtuozzo™ servers (available from SWsoft, Inc.), Virtuozzo for Windows™ servers (available from SWsoft, Inc.), wireless access servers, wireless routers and wireless access points, Windows workstation server, NET BIOS servers, NET BEUI servers, and various TCP/IP servers.

In this discussion, a VPS (VE) is understood to be a set of services with an identifier that is unique in some context. There are ways to distinguish one VPS from another, which are referred to as "isolation." The VPSs can be different in nature, and their isolation can also be different, depending on the technical implementation.

Another way to implement a VPS is to separate a set of processes in a single OS kernel. Each VPS can be declared to have a set of OS processes, kernel structures, etc. Depending on the particular implementation, this approach can involve different levels of isolation—starting from hard resources isolation with guarantees, separate disk space, etc up to a virtual absence of resource isolation.

VPS isolation can include, for example, logical isolation of processes, physical isolation of processes, resources isolation, namespace isolation, data isolation, address isolation, fault isolation and performance isolation (partial or full).

Isolation of processes refers to processes that are running in the same OS kernel, but are separated by means of OS or user space processes. Physical isolation of processes means that processes are running in different media (for example, in native OS and inside a virtual machine). Resource isolation means that resources used inside one VPS are not available in another VPS (for example, dedicated disk areas, VM emulators, dedicated CPU, etc.). Namespace isolation refers to the case where names used in one VPS can be used inside another VPS—for example, they can have same names of OS named objects, same user names and so on—but objects with the same names will be different in different VPSs. Data isolation refers to the case where data used in one VPS is isolated and cannot be used in another VPS. For example, each VPS can have its own private set of files for webserver services.

Address isolation refers to each VPS having its own isolated addresses that cannot be used inside another VPS. For example, the VPSs can have different IP addresses, different DNS names or processes with different OS Process Identifiers (PIDs).

Fault isolation refers to isolation of faulted application, i.e., if the application fails in one VPS, another VPS will be not affected.

Performance isolation is where behavior of one VPS (or of processes inside one VPS) will not influence to performance of another VPS if the user requests for service are within a specified some service level agreement (SLA) bounds.

Physical hardware isolation is used to configure single computer hardware so that it appears to be split into a set of semi-independent computers. The examples of this are the schemes previously used by Sun Microsystems, Inc. for domain partitioning, as well as "blade" servers, etc.

Logical hardware isolation is used to logically reconfigure a single hardware to a set of semi-independent computers. An example of this is IBM LPAR (logical partitioning).

Examples of VPS implementation technologies include SWsoft Virtuozzo™ technology, Microsoft Windows Terminal Services, FreeBSD jail and UNIX chroot environments.

The most straightforward implementation can include only nominal "logical" isolation, when only the user knows which processes belong to which VPS, without special support in OS kernel and even without support in user-mode applications. In such an implementation, the term "VPS" can still be used, because typically users can treat this group of services as a logically indivisible entity. This can also include so-called "virtual servers" of a webserver that share a single instance of Apache server and use an IP address and/or DNS name for services separation. SWsoft Plesk™ servers use separate webservers for ordinary users and for administrators. This allows treating both of them as two VPSs, with one of them dedicated to administration purposes.

With the above discussion in mind, each group of services can be optionally protected by its own firewall (here, 136A, 136B). It can have its own file server (here, 114A, 114B). The services provided by the group of services, or by the VPS 202A, are grouped together in some logical manner from a user's or operating system's perspective. Each VPS 202A may optionally have its own webserver (for example, 104 of FIG. 1). The administration interface 130 can be dedicated to managing this particular group of services (202A), and/or several groups of services, and/or the entire computer system 102.

Figure 3:
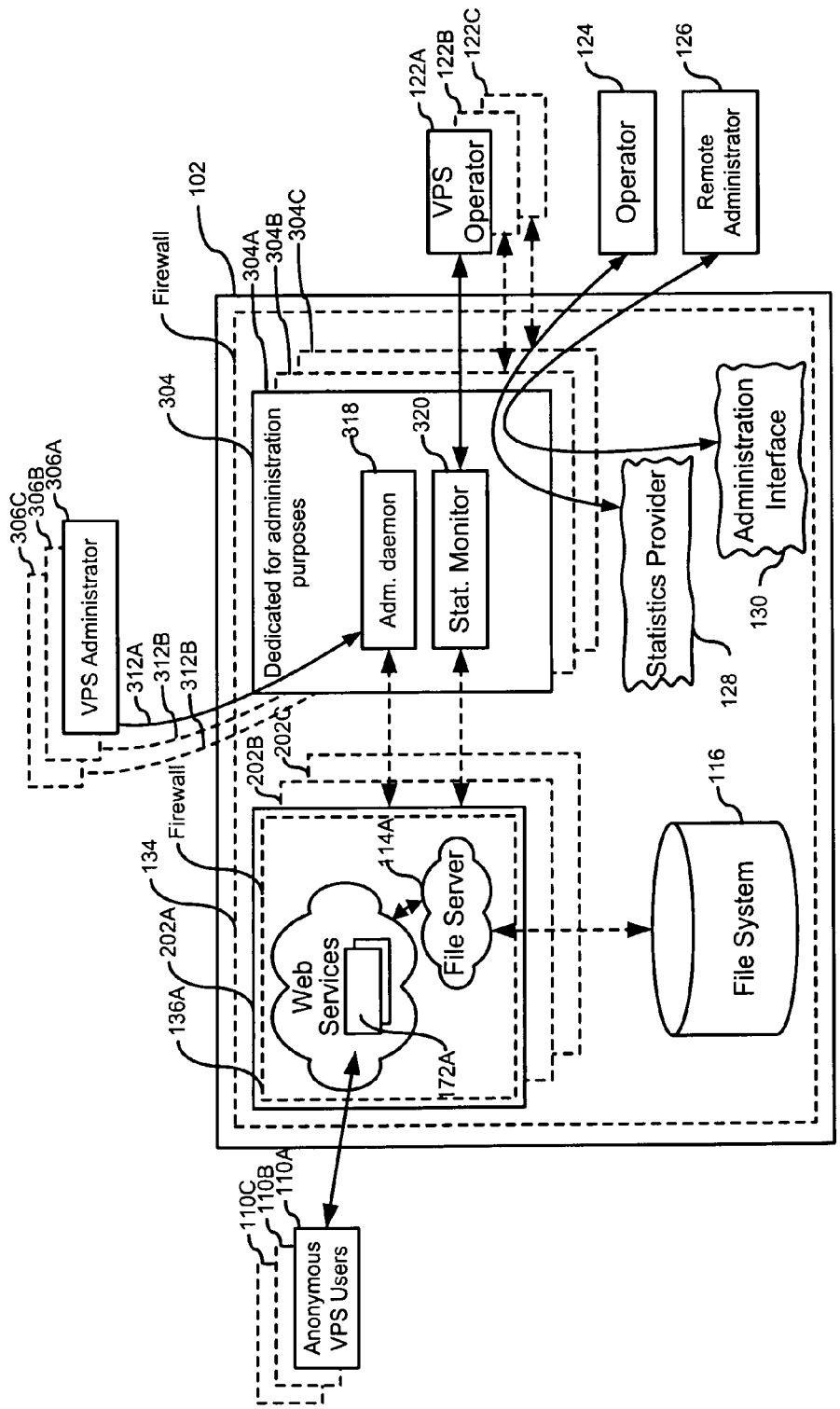
FIG. 3 illustrates an exemplary embodiment where one VPS has been dedicated for administrative purposes.

FIG. 3 illustrates an embodiment of the present invention where one of the groups of services (for example, a "service VPS," an "isolated VPS" or an "administrative server") has been dedicated to administrative purposes, and is labeled 304 in FIG. 3. For simplicity, element 304 will be referred to in the text below as a "service VPS," although it is understood that it need not always be a VPS, but rather is a logical dedicated grouping of certain administrative and/or other processes/functions that relate to the management of the VPSs 202 and/or the management functions of the computer system 102 and its operating system.

A set of groups 304 can also be used for such administrative purposes. The term "administrative" is used in a broader sense than its typical usage, and includes additional functions that extend beyond normal administrative functions, such as, for example, responding to user requests and multiplexing of VPSs 202. Administrative functions may also be thought of as operations that are not intended to serve end users, but are auxiliary in nature, such as backup/restore data, or which can be used to provide some enhancements (e.g., performance, scalability, etc.) for computer system itself.

Other examples of administrative operations include installation/removal of OS components and user applications, configuring of OS components and user applications, configuring networking hardware and firewalls, computer hardware, and wireless hardware, servicing of VPS migration requests, servicing of processes migration requests, and servicing of requests for computer system resources. Servicing of requests of migration processes from one computer to another one can be done offline (when the process is stopped before migration and is later restored) and online (when the process is migrated transparently to users and other processes).

The service VPS 304 can have its own VPS operator 122, its own administrator 306, and interfaces directly to the statistics provider 128 and the administration interface 130, as shown in FIG. 3. In other words, the service VPS 304 can be conceptually similar to the VPS 202A in the sense of being a server process, but serves different functions.

For example, the VPS 304 can have an administrative daemon 318, which communicates with the VPS 202A for management purposes. Also, a statistics monitor 320 can interface to the VPS 202A, for collection of statistics relating to, for example, resource utilization by the VPS 202A. The statistics monitor can interface to the VPS operator 122.

Note that in FIG. 3, the arrows (communications lines) linking the operator 124 to the statistics provider 128, and the arrow linking the VPS remote administrator 126 to the administration interface 130, go through the VPS 304, although that need not always be the case, and the communication may be direct.

Thus, the VPS 304 is referred to as a "service VPS," an "administrative server," or as a "service environment," since the primary purpose of these VPSs 304 is not servicing end users, but servicing administrative functions (in the broad sense discussed above). Examples of services that may be handled by the service VPS 304 include, for example, the following:

(1) management of chroot environment (a UNIX concept that gives a user an appearance that some private directory is a root directory);

(2) management of a jail environment (a FreeBSD concept) and a sand box environment, both of which refer to creation of a secure environment within a server, where process failure or crash does not affect the rest of the computer system 102;

(3) management of a session of Windows Terminal Service;

(4) management of instances of Virtual Private Servers;

(5) management of Virtuozzo™ Virtual Private Server and Virtuozzo™ Virtual Environment, available from SWsoft, Inc.;

(6) management of Plesk™ servers, marketed by SWsoft, Inc.; and (7) Other examples include data backup and restore operations, updates installation (OS and applications), checking permissions for operations, security-related analysis and operations, audit of operations, application installation and configuration, network and other OS and application parameters configuration, driver installation and upgrade, spam filter operations, firewall installation and configuration, creation/deletion of users creation/deletion of groups, license-related management, remote access management, certificates management and data updates.

With reference to FIG. 3, each VPS administrator 306 does not need to be connected directly to its own VPS 202. Rather, the VPS administrator 306 can be connected to a service VPS 304, or a number of VPS administrators 306A, 306B, 306C, etc. can be connected to corresponding VPSs 202 via the service VPS 304.

Note also that there may be a number of such service VPSs 304, each one dedicated to a particular service. Thus, one such administrative server 304 can be dedicated to handling web page requests, another can be dedicated to handling authorization of administrators of the VPSs 202, another one can be dedicated to handling network traffic management, another one might only handle email, another one might only handle FTP requests, etc. Note that in this case, there will not be necessarily a one-to-one correspondence between operators 122A-122C and service VPSs 304A-304C. Generally, there also will not be a one-to-one correspondence between a VPS 202 and a service VPS 304; in other words, normally, one service VPS 304 will interface to a number of VPSs 202. Alternatively, a single service VPS 304 can handle all of the administrative requests for all of the servers 202.

In FIG. 3, 312 designates a request or command from the VPS administrator 306 to its corresponding VPS, which is intercepted by the service VPS 304. Note that the existence of the service VPS 304 is usually transparent to both of the users 110, administrators 306, and authorized users 156.

In FIG. 3, the VPS operator 122 can monitor the performance and the statistics of the particular VPS through the service VPS 304.

The service VPS 304 can perform any, or all, or some subset, of the following exemplary functions:

1) response to requests for statistics and performance parameters and the performance counters of a particular VPS 202;

2) response to requests for administration of the operating system and its services and daemons;

3) response to requests for administration of the processes running within the computer system 102 (such as VPSs 202, webservers 104, virtual servers 108, statistics provider 128, etc.);

4) response to requests for allocation or reallocation of resources of the computer system 102;

5) response to requests for authorization within the operating system of the computer system 102;

6) response to authorization within itself (i.e., within the service VPS 304);

7) response to requests for authorization within VPSs 202 and similar processes that require authorization;

8) response to other operations that may potentially be non-executable within either the service VPS 304 or the VPSs 202;

9) response to requests for operation, where the requests could lead to a process failure or a crash within a VPS 202;

10) response to requests originating outside of the service VPS 304, such that to an external user or requestor, the process of generating the response is transparent in the sense that it appears that the target process (e.g., VPS 202) is the actual respondent (see FIGS. 4 and 6, discussed below);

11) response to requests for multiplexing of a service, such that the response is processed either sequentially or simultaneously by the VPSs 202. To an external user, it appears as if the service being requested is performed by a VPS to which the user is connected.

Figure 4B:
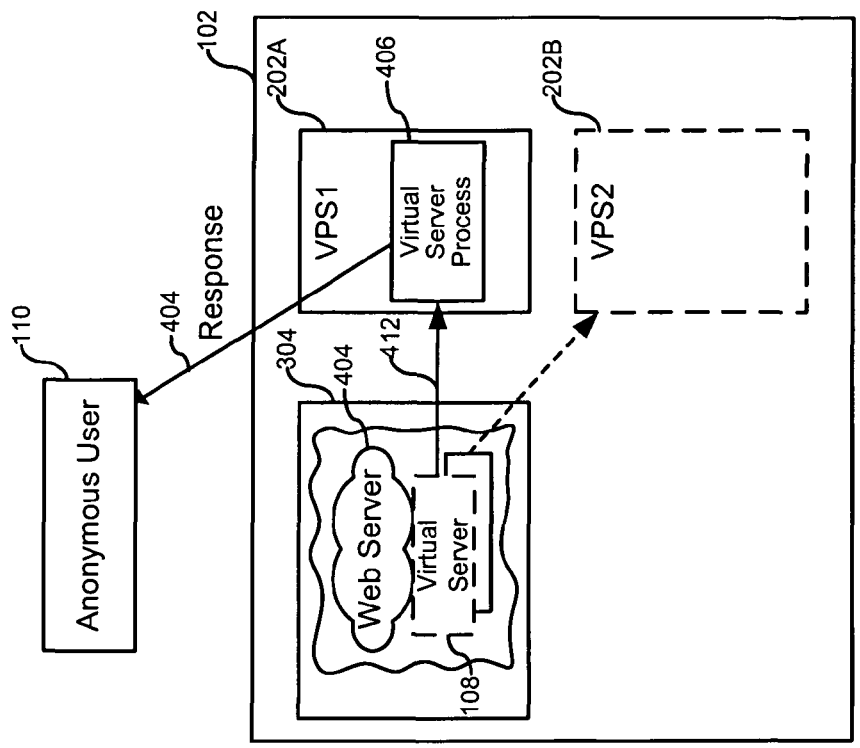
FIGS. 4A and 4B illustrate the process of handling a request from an anonymous user.
Figure 4A:
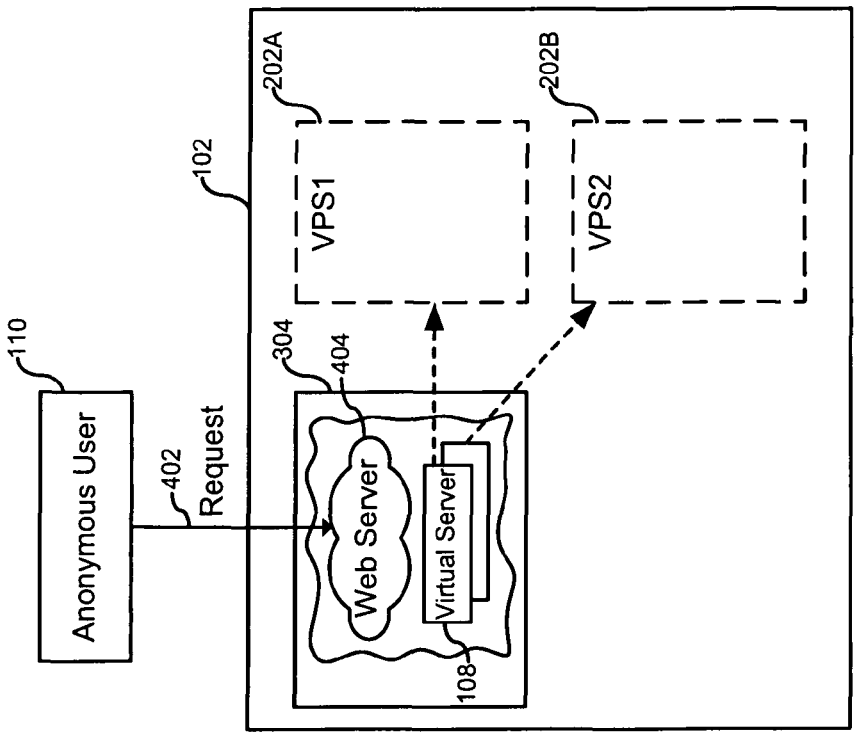

FIGS. 4A and 4B illustrate the process of receiving a request from an anonymous user 110. As shown in FIG. 4A, the anonymous user 110 sends a request 402 to the computer system 102, which is intercepted by the service VPS 304. The service VPS 304 includes a number of virtual servers 108 and a webserver 104. The service VPS 304 determines a processing VPS and routes the request (see 412 in FIG. 4B) to an appropriate VPS (in this case, 202A). The VPS 202A then sends a response 404 back to the anonymous user.

Figure 5:
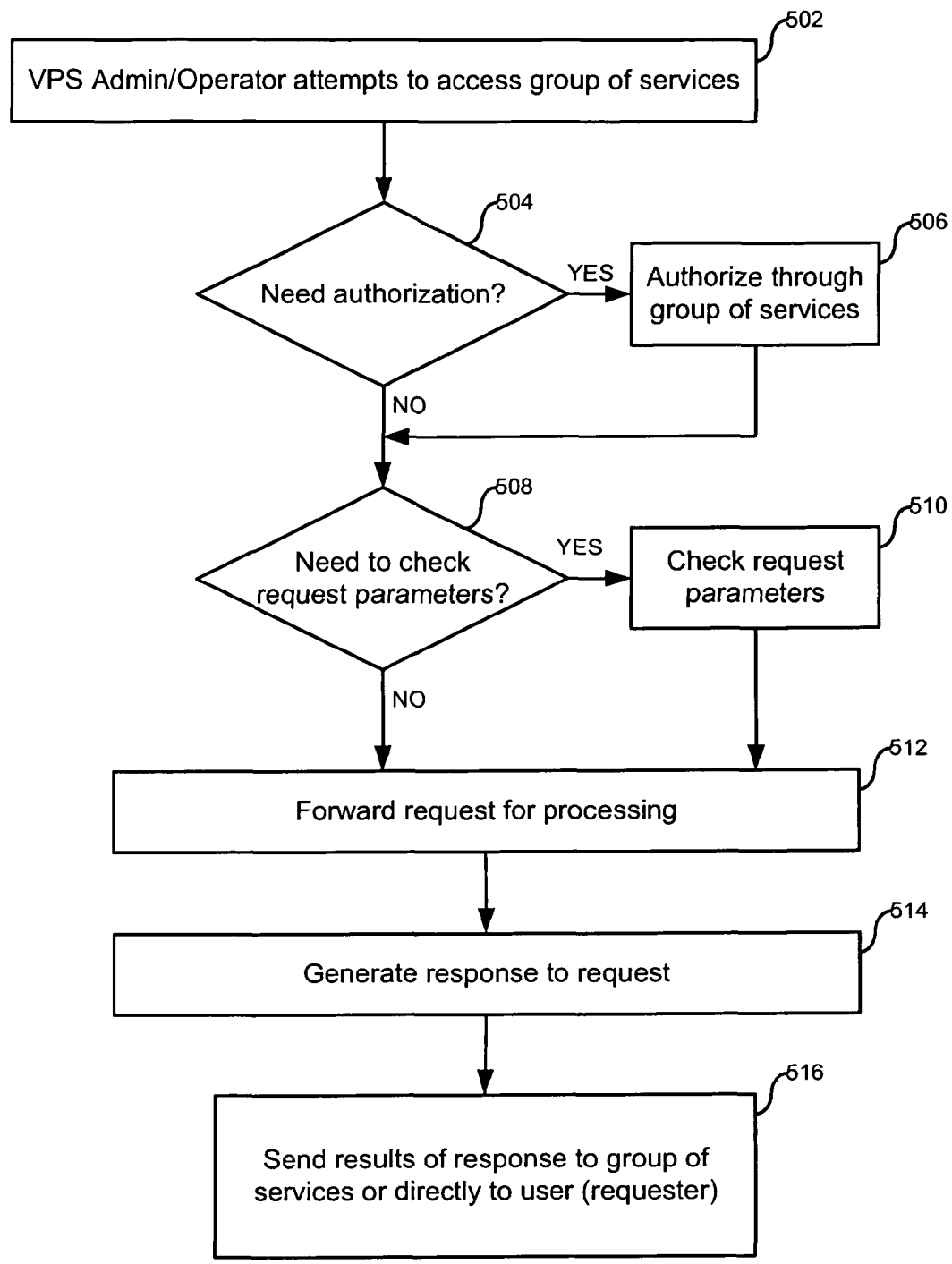
FIG. 5 illustrates the process of servicing a user request, in accordance with an exemplary embodiment.

FIG. 5 illustrates the process of processing a request that requires intervention of the service VPS 304. As shown in FIG. 5, a VPS administrator or a VPS operator attempts to access a VPS 202 in a manner that requires intervention from the service VPS 304 (step 502). If the request 402 needs authorization (step 504), the user is authorized through the service VPS 304 (step 506), and then proceeds to step 508, which determines whether there is a need to check parameters of the request. If no authorization is needed at step 504, then the process proceeds directly to step 508. At step 508, if there is a need to check request 402 parameters, the parameters are checked and verified (step 510). The process then executes the request 402 in a particular VPS 202, for example, forwards it for processing, see 412 in FIG. 4 (step 512). If parameters of the request do not need to be checked, then the process proceeds directly from step 508 to step 512. After step 512, a response to the request is generated (step 514). The response is then forwarded to the requestor (step 516).

Thus, the process of servicing a user request, which is illustrated in FIG. 5, is handled by the service VPS 304, and typically includes a number of steps, such as:

1) receiving a request 402 by the service VPS 304, where the request is typically received through a network or some other communications channel. The communications channel may include network connections and sockets, network protocols, inter-process communications used by the operating system, remote procedure calls, local procedure calls, and data exchange mechanisms (see 312, 402, and 404 in FIGS. 3 and 4);

2) optional authorization;

3) optional verification of request 402 parameters by the service VPS 304;

4) transferring the request 402 to the target process or environment (e.g., to the VPS 202);

5) processing the request 402 at the target process or environment;

6) optional sending of the response 404 from the processor of the request to the requestor;

7) optional sending of the response 404 to the user (requester) by the service VPS 304.

A fact of life of data center operation, particularly operation of certain types of webservers, is that the vast majority of the time the servers are not actually doing anything. For example, in the case of webservers maintained by individuals, and which contain personal content (for example, family photos, etc.), the absolute majority of the time such a webserver is not actually responding to any requests, since there are no requests to respond to. However, such a webserver, which can include all the usual aspects of a webserver (in other words, the server itself, firewalls, file servers, etc.) still involves substantial overhead.

For example, it can require 10 megabytes of actual, physical memory for each such web server. Clearly, this is a wasteful approach, and it would be preferable, in the case of such mostly inactive webservers, to only activate them when necessary. At the same time, the fact that the webserver is not actually "alive" most of the time should be transparent to the user.

In this case, the Virtual Private Servers (202A, 202B, etc.) need not actually exist, until a request 402 is received. Alternatively, if they exist, they can exist in a "minimal" form, that requires only very modest overhead. At the moment of receiving the request 402, the service VPS 304 determines where that request should be routed, activates the appropriate VPS, and forwards the request to that VPS. A virtual server process 406 can be launched within the VPS 202A to handle generating the response 404. The response 404 may be routed to the anonymous user directly, or may be routed to the anonymous user 110 back through the webserver 104 within the service VPS 304. This mechanism allows a multiplexing of requests by anonymous users 110. The service VPS 304 can determine which VPSs 202 need to live "permanently," and which can be terminated and instantiated only upon receiving a request for service. Note that in FIG. 4, although the requester is shown as the anonymous user 110, the requester may also be an authorized user.

Figure 6:
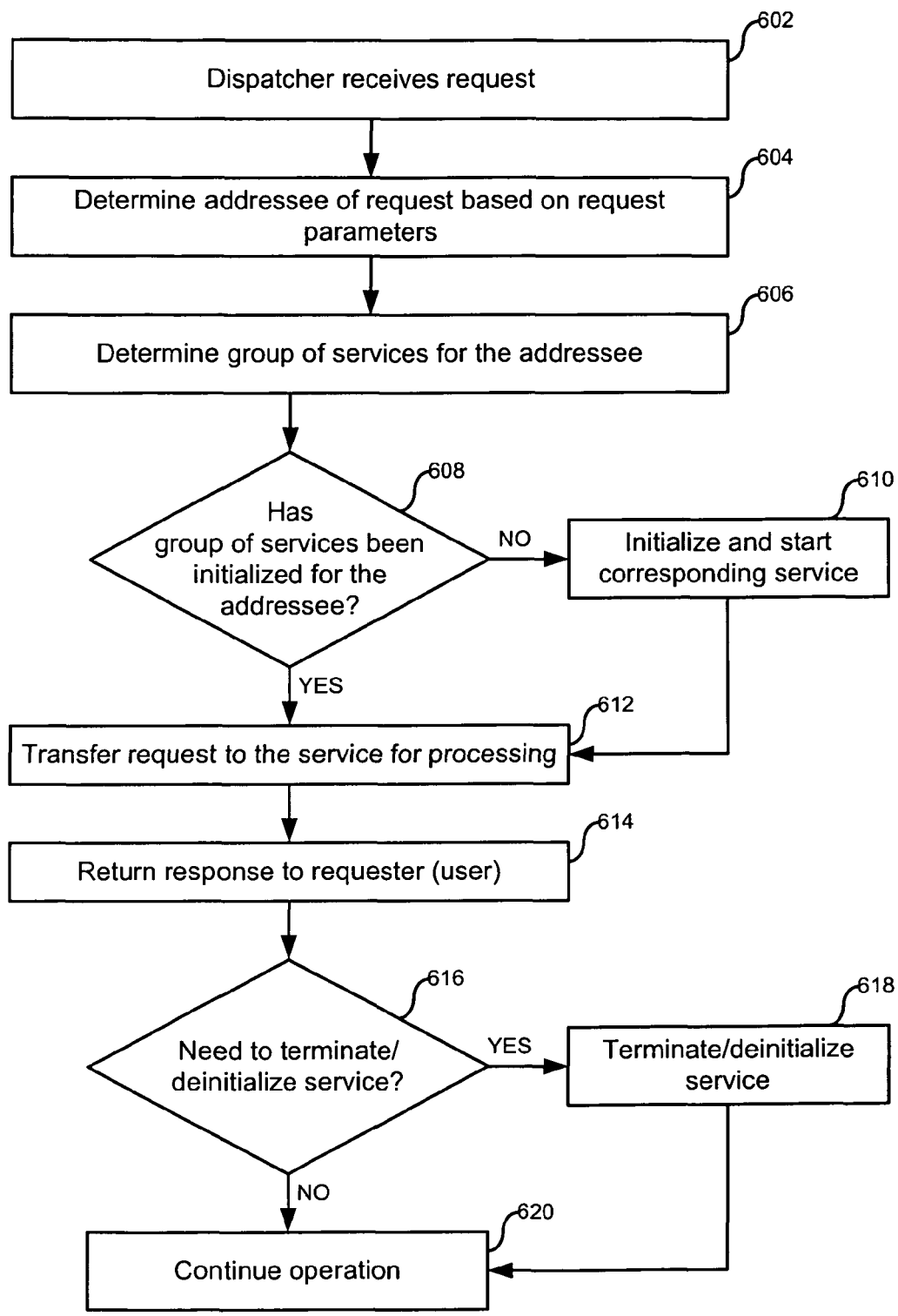
FIG. 6 illustrates the process of multiplexing of a particular service using the service VPS, in accordance with an exemplary embodiment.

FIG. 6 illustrates the process of multiplexing server processes using the service VPS 304. As shown in FIG. 6, a dispatcher receives a request for service 402 (step 602). An example of a dispatcher is an instance of a service VPS 304, for example, one that is specifically dedicated to the function of intercepting such user requests. The addressee of the request 402 is determined, based on request parameters (step 604). The group of services (in other words, the VPS 202 that needs to perform the actual responding to the request 402) for that addressee is determined (step 606). The service VPS 304 then needs to determine whether the target group of services (e.g., a VPS 202) has been initialized for that particular request 402 (step 608). If it has not been initialized, then it needs to be initialized and launched (step 610). The request 402 is then transferred to that VPS 202 for processing, see 412 in FIG. 4 (step 612). The response 404, once generated by the VPS 202, is then returned to the requestor (user or administrator) (step 614). If the started-up group of services or VPS 202 needs to be terminated or de-initialized (step 616) then that VPS 202 is terminated (step 618). Normal operation then continues (step 620).

The request for service that triggers multiplexing can be received using a network protocol, such as TCP/IP; or it may be received within a packet of data. In other words, the parameters of the request 402 could be determined based on packet metadata (e.g., the IP address to which this packet needs to be delivered), without "looking inside" the packet itself, or it may be based on the data within the packet.

The use of a dedicated VPS 304 for the purpose of administrative functions provides the advantage of having greater security for the process, and better control over the administration of the VPSs 202, and their resources. Better security is usually due to possible isolation of VPSs from each other, and due to unification of configuration of the VPSs, and therefore standardization of administration operations, which simplifies support operations for user and administration services themselves. Additionally, the overhead associated with this approach is lower than other approaches, which either use operating system calls, or embed these functions in each VPS 202.

Figure 7:
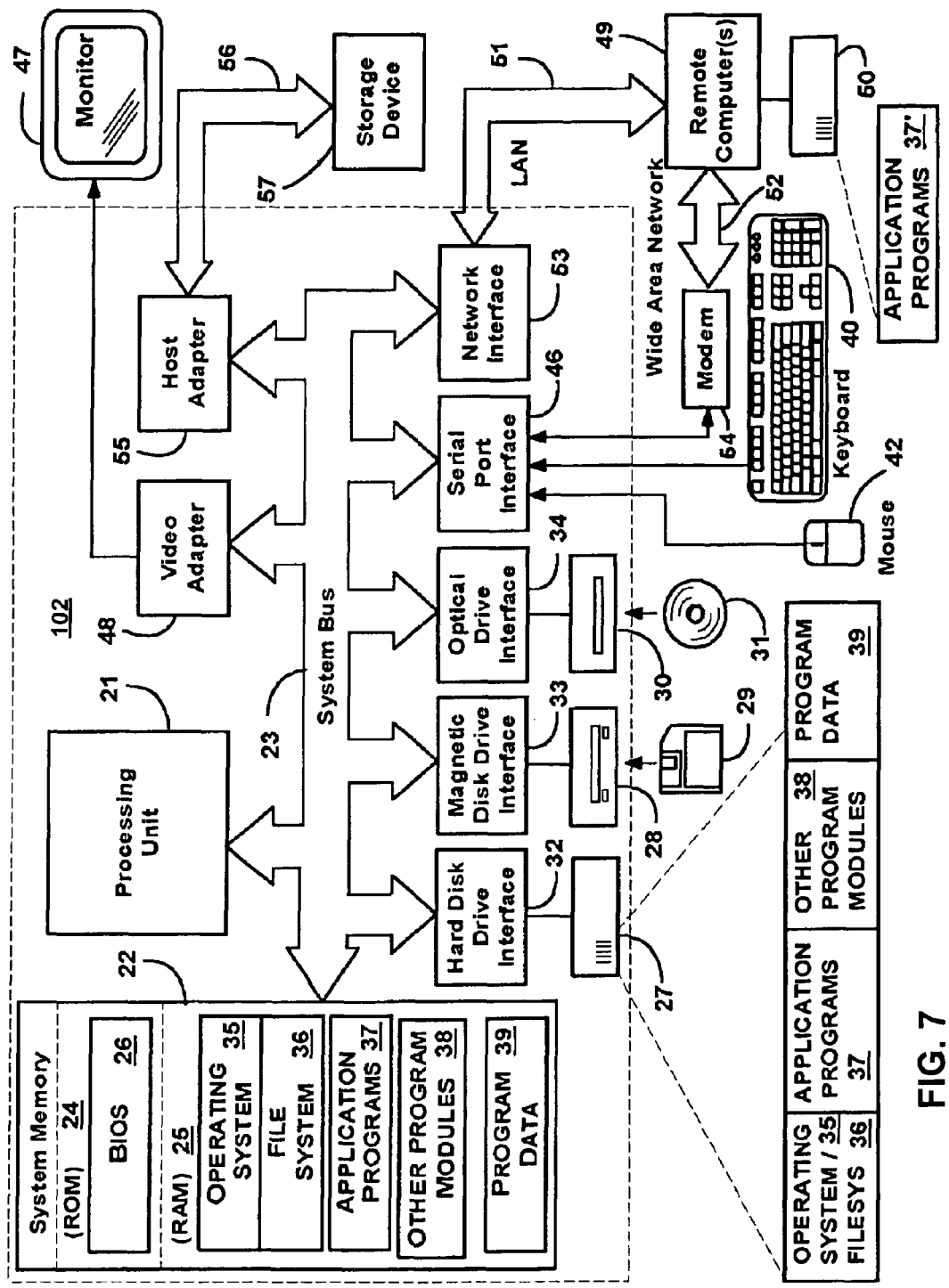
FIG. 7 illustrates an example of a computer system that can be used in the exemplary embodiment.

An example of a computer system, or host, where the present invention can be implemented is illustrated in FIG. 7. An exemplary system for implementing the invention includes a general purpose computing device in the form of a computer or a server 102 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24.

The computer 102 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively.

The drives and their associated computer-readable media provide non-volatile storage of computer readable instructions, data structures, program modules and other data for the computer 102. Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (preferably Windows™ 2000). The computer 102 includes a file system 36 associated with or included within the operating system 35, such as the Windows NT™ File System (NTFS), one or more application programs 37, other program modules 38 and program data 39. A user may enter commands and information into the personal computer 102 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The computer 102 may operate in a networked environment using logical connections to one or more remote computers 49. The remote computer (or computers) 49 may be another personal computer, a server, a router, a network PC, a peer device or other common network node, and typically includes many or all of the elements described above relative to the personal computer 102, although only a memory storage device 50 has been illustrated in FIG. 7. The logical connections depicted in FIG. 7 include a local area network (LAN) 51 and a wide area network (WAN) 52. Such networking environments are commonplace in offices, enterprise-wide computer networks, Intranets and the Internet.

When used in a LAN networking environment, the personal computer 102 is connected to the local network 51 through a network interface or adapter 53. When used in a WAN networking environment, the computer 102 typically includes a modem 54 or other means for establishing communications over the wide area network 52, such as the Internet. The modem 54, which may be internal or external, is connected to the system bus 23 via the serial port interface 46. In a networked environment, program modules depicted relative to the computer 102, or portions thereof, may be stored in the remote memory storage device. It will be appreciated that the network connections shown are exemplary and other means of establishing a communications link between the computers may be used.

Figure 8:
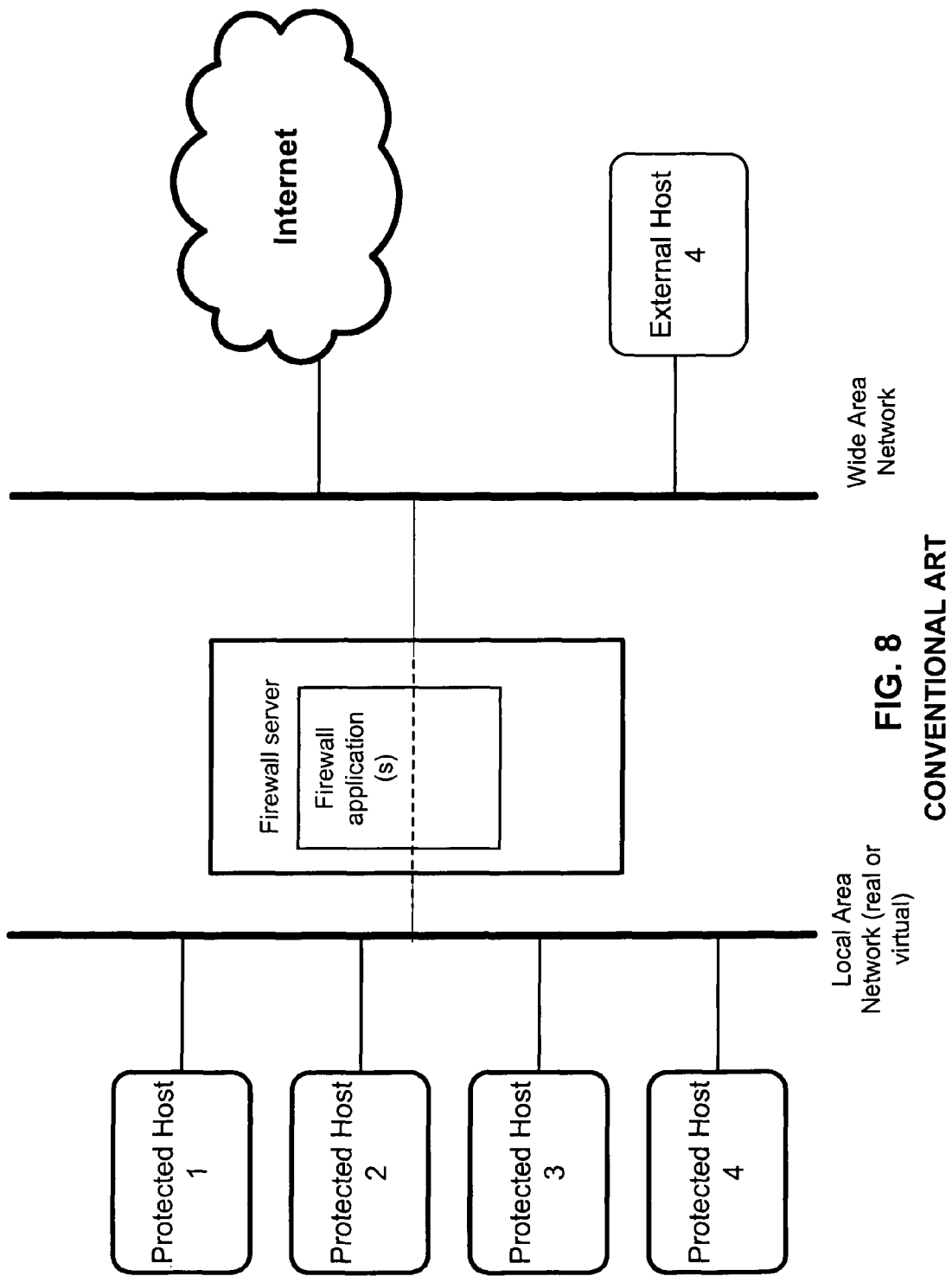
FIG. 8 illustrates a generic conventional security infrastructure with the firewall server located between LAN and Wide Area Network.

Another embodiment is focused on dedication of one or more VEEs for administration and management of security services for remote users. With respect to security services, FIG. 8 illustrates a generic conventional security infrastructure with a firewall server located between a LAN and a Wide Area Network. The firewall server executes firewall applications, which provide security services to LAN hosts located behind the firewall. The firewall rules and policies in this case are the same for all of the protected host servers, and only common security services are provided by the firewall server to all of the host servers.

Figure 9:
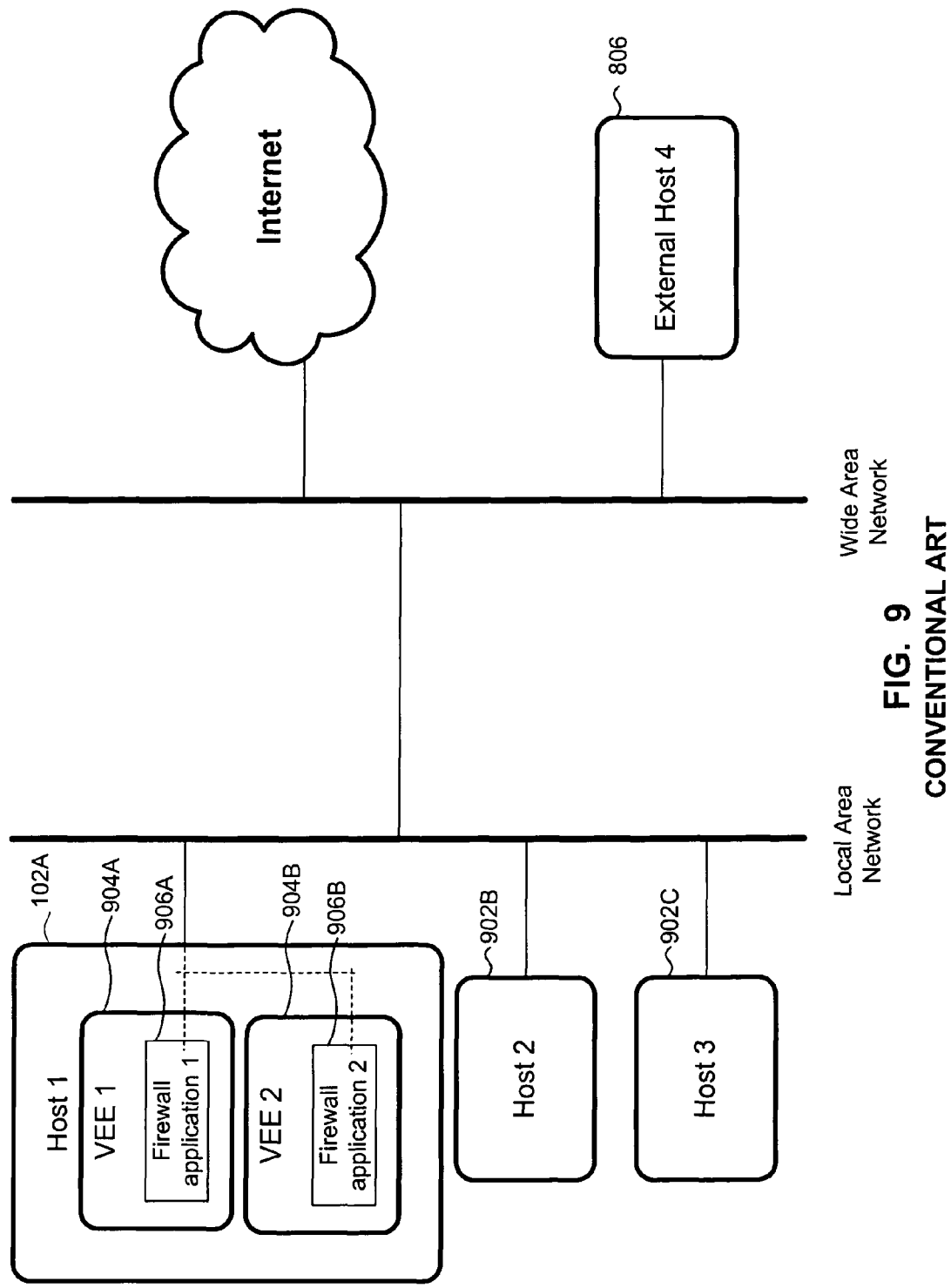
FIG. 9 illustrates a security infrastructure in the context of the Virtual Execution Environment (VEE) with the different firewall application being implemented within each of the VEEs.

There is an obvious need to provide security services based on specific needs of the individual host servers. The system for providing different firewall services to each of the host servers is illustrated in FIG. 9. Each of the host servers has an operating systems 902A-902C. These operating systems 902 run the number of VEEs. For example, the operating system 902A of the host server runs two VEEs. The VEEs may be in a form of Virtual Machines (VMs) 904A and 904B respectively (or can be VPSs). VM 904A runs its own firewall application 906A and VM 904A also runs its own firewall application 906B. In this case, firewall applications 906A and 906B can have different security settings specific to VMs they protect. Thus, VMs 904A and 904B are protected by their own firewall applications 906A and 906B from Internet and external servers 806. This security arrangement, while providing security advantages over the conventional firewall system depicted in FIG. 8, suffers from the significant operational overhead caused by the need to run a number of firewall applications on the same host server.

Figure 10:
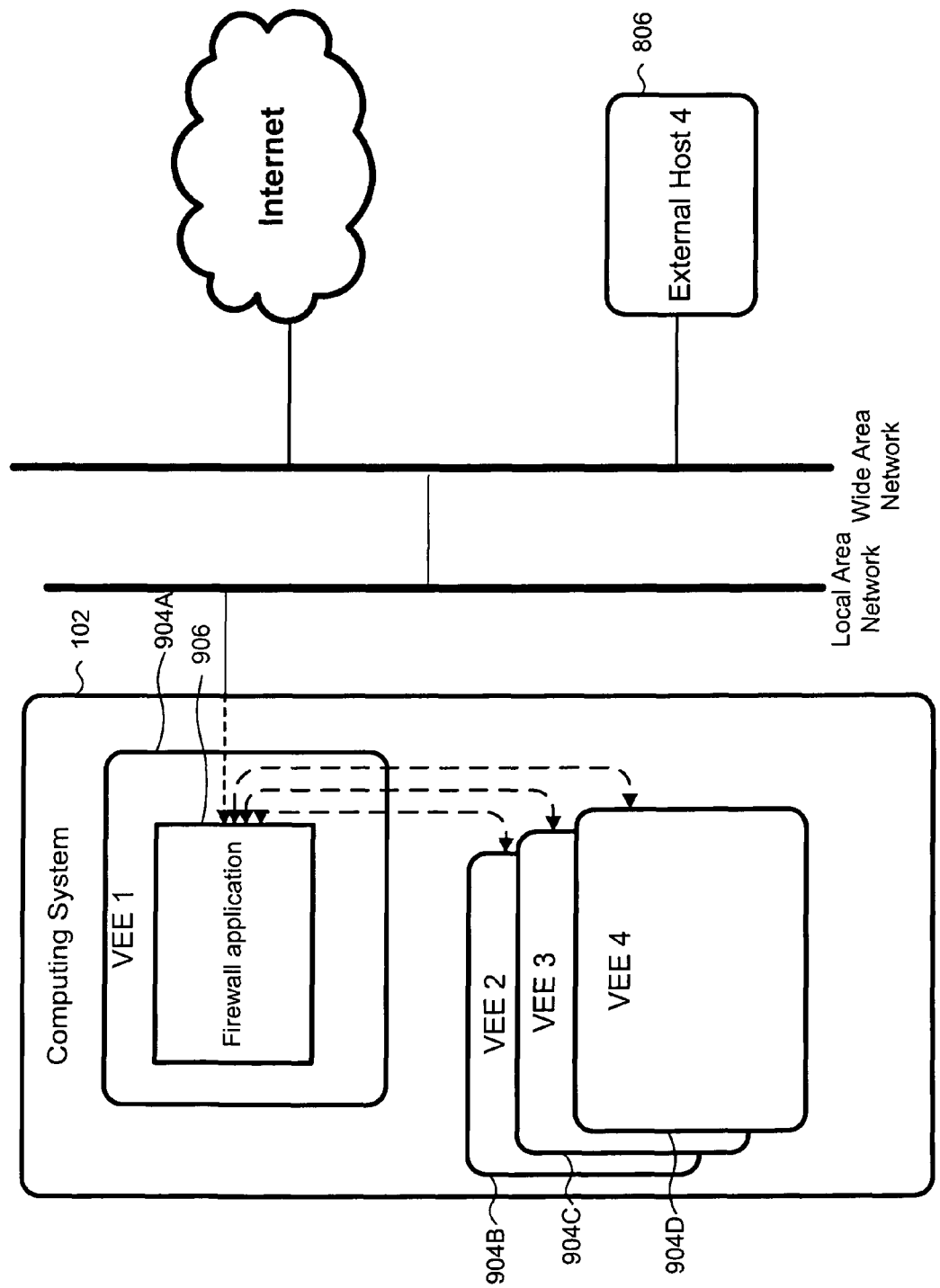
FIG. 10 illustrates how a designated VEE provides firewall functionality for several other VEEs, in accordance with an exemplary embodiment.

This problem is solved by dedication of one or more VEEs to providing the firewall services to other VEEs, as illustrated in FIG. 10. The server 102 has, for example, four VEEs running on the physical machine. The VEEs in this example are the Virtual Machines 904A-904D, all of which require firewall services. The firewall application 906 runs only within dedicated VEE on the VM 904B and provides firewall services to other VMs 904B-904D running within respective VEEs. The firewall application 906 provides firewall services to VMs 904B-904D according to the private security data set of each of the VMs. Thus, VMs 904B-904D are protected by firewall application 906 from Internet and external servers 806.

Firewall services of this embodiment can include, but are not limited to, intrusion detection, alarms, authentication based on user-specific parameters, authentication based on VEE-specific parameters, authentication based on a combination of the user-specific parameters and the VEE-specific parameters, and detection of denial-of-service attack.

Figure 11:
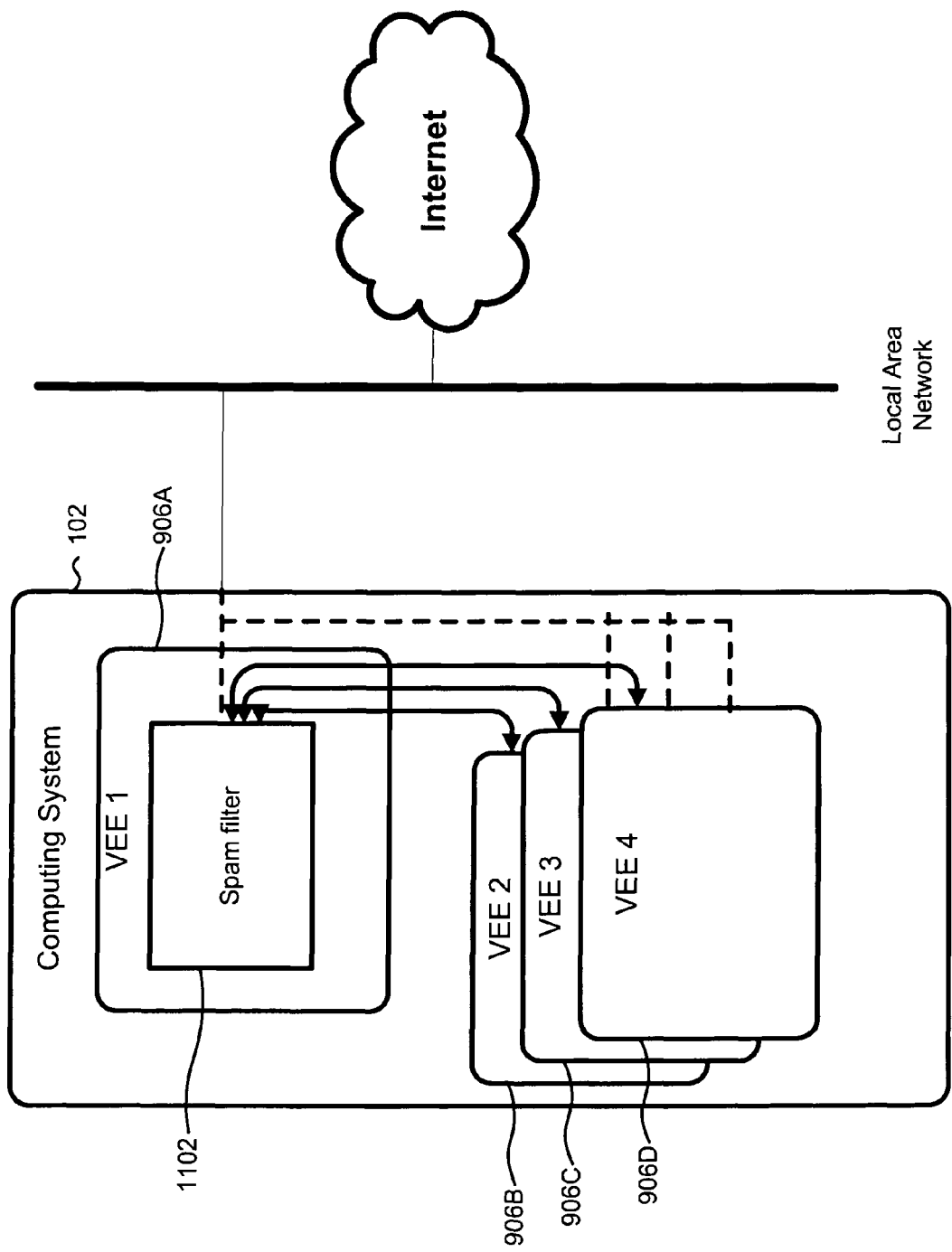
FIG. 11 illustrates how a designated VEE provides spam filtering functionality for several other VEEs, in accordance with an exemplary embodiment.

The security services provided by the designated VEE are not limited to firewall services and can include spam filtering and anti-virus protection. FIG. 11 illustrates how a designated VEE provides spam filtering functionality for a plurality of other VEEs. Spam filtering services implementation is similar to the firewall implementation. In this example, the server 102 has four VEEs running on its operating system. The VEEs can be the Virtual Machines 906A-906D (or can be VPSs), all of which require spam filtering services.

The spam filter application 1102 runs only within dedicated VEE on the VM 906A and provides spam filtering services to other VMs 906B-906D running within respective VEEs. The spam filtering application 1102 provides spam filtering services to VMs 906B-906D according to the private security data set of each of the VMs. Having spam filtering application run on the dedicated VM 906A significantly reduces operational overhead and makes the spam filtering application more stable.

Spam filtering services of this embodiment can include, but are not limited to, filtering content based on user-specific parameters only, filtering content based on VEE-specific parameters only, and filtering content based on a combination of the user-specific parameters and the VEE-specific parameters.

Figure 12:
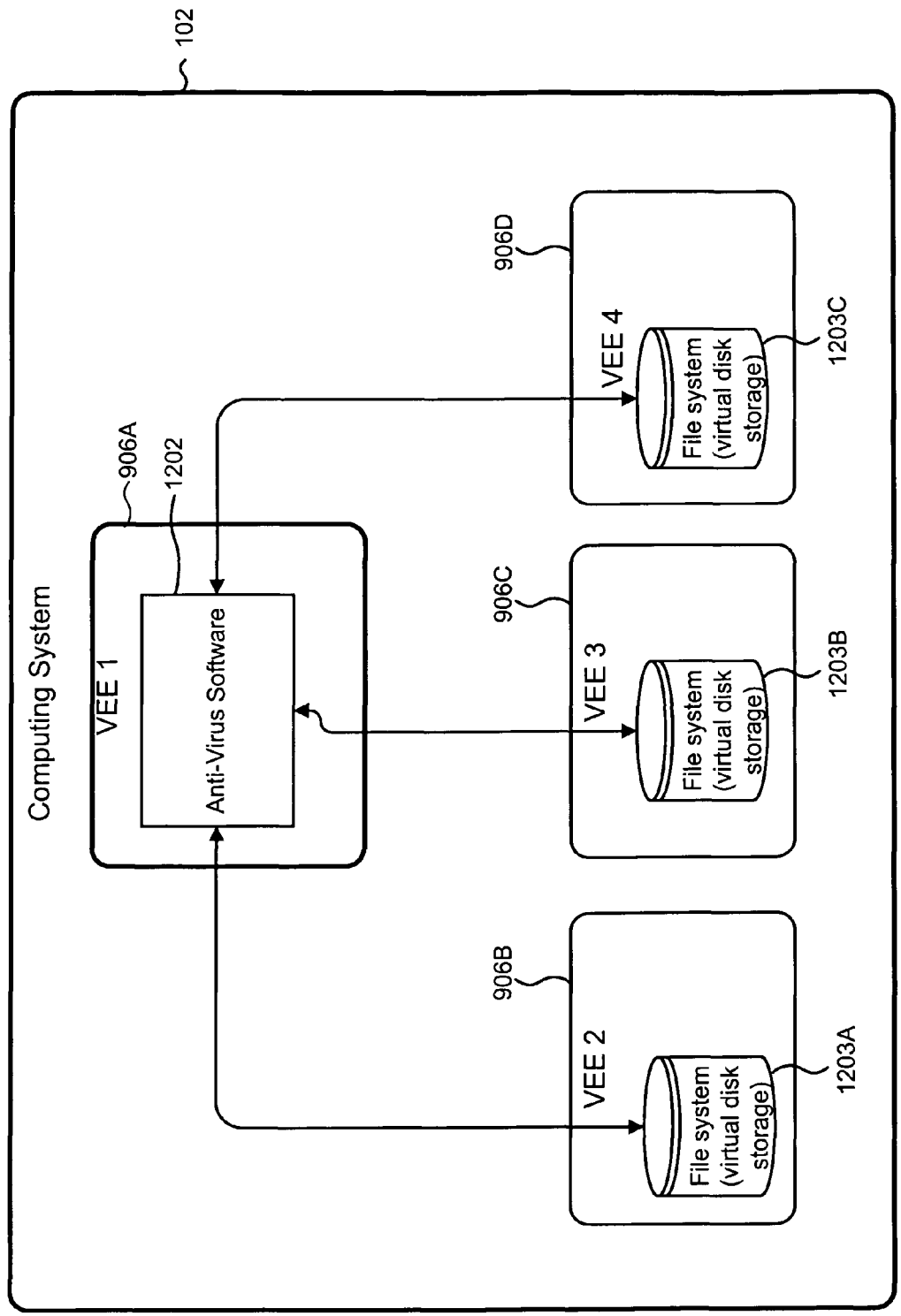
FIG. 12 illustrates how a designated VEE provides antivirus protection for a plurality of other VEEs, in accordance with an exemplary embodiment.

FIG. 12 illustrates how a designated VEE provides anti-virus protection for a plurality of other VEEs. Anti-virus application 1202 runs within designated VEE on VM 906A and provides ant-virus protection to VMs 906B-906D. In this embodiment incoming traffic is not scanned by anti-virus application like it is implemented with spam filtering depicted in FIG. 11.

Anti-virus application 1202 has its own database with known virus data. Anti-virus application 1202 accesses the file systems 1203A-1203C of VMs 906B-906D and scans them for viruses. File systems 1203A-1203C can be virtual disc storages of respective VEEs or parts of a physical memory of the computer system 102. The anti-virus application 1202 provides anti-virus protection services to VMs 906B-906D according to the private security data set of each of the VMs. This security arrangement allows significant reduction of operational overhead by using only one database for executing the anti-virus application on different VMs.

Anti-virus protection services of this embodiment can include, but are not limited to, detection of known viruses based on matching a virus template from an individual VEE's file system; detection of viruses based on bit pattern analysis; detection of viruses based on recognition of decryption routines; detection of viruses based on file extensions; detection of viruses based on recognition of dummy loops, and detection of viruses based on hash values calculated from a potential virus code.

Figure 13:
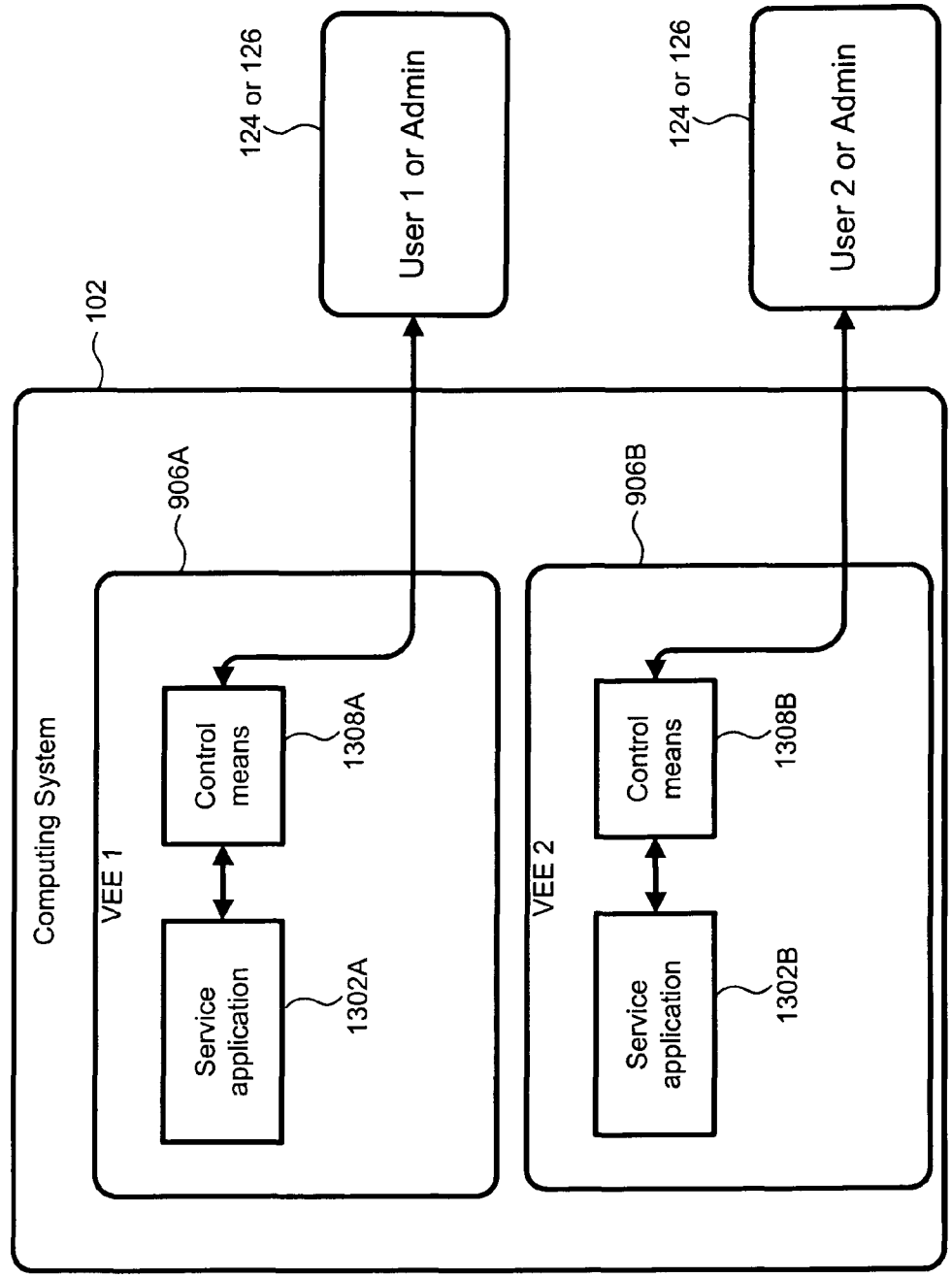
FIG. 13 illustrates a computing system infrastructure in the context of the Virtual Execution Environment (VEE) with the different service applications being implemented and controlled by each of the VEEs, in accordance with an exemplary embodiment.

An example of an arrangement for control and administration of service applications in Virtual Execution Environment is illustrated in FIG. 13. In this exemplary embodiment, two different VEEs run on the operating system 102. VMs 906A and 906B of the respective VEEs are controlled by users 124 and administered by administrators 126. The service applications 1302A and 1302B running on the VEEs 906A and 906B are controlled by control means 1308A and 1308B respectively. Thus, each VEE runs its own service application controlled by its own control means. While this VEE security infrastructure is functional and effective, it suffers from a significant operational overhead caused by necessity to run an instance of a service application coupled to control means on each of the VEE.

Figure 14:
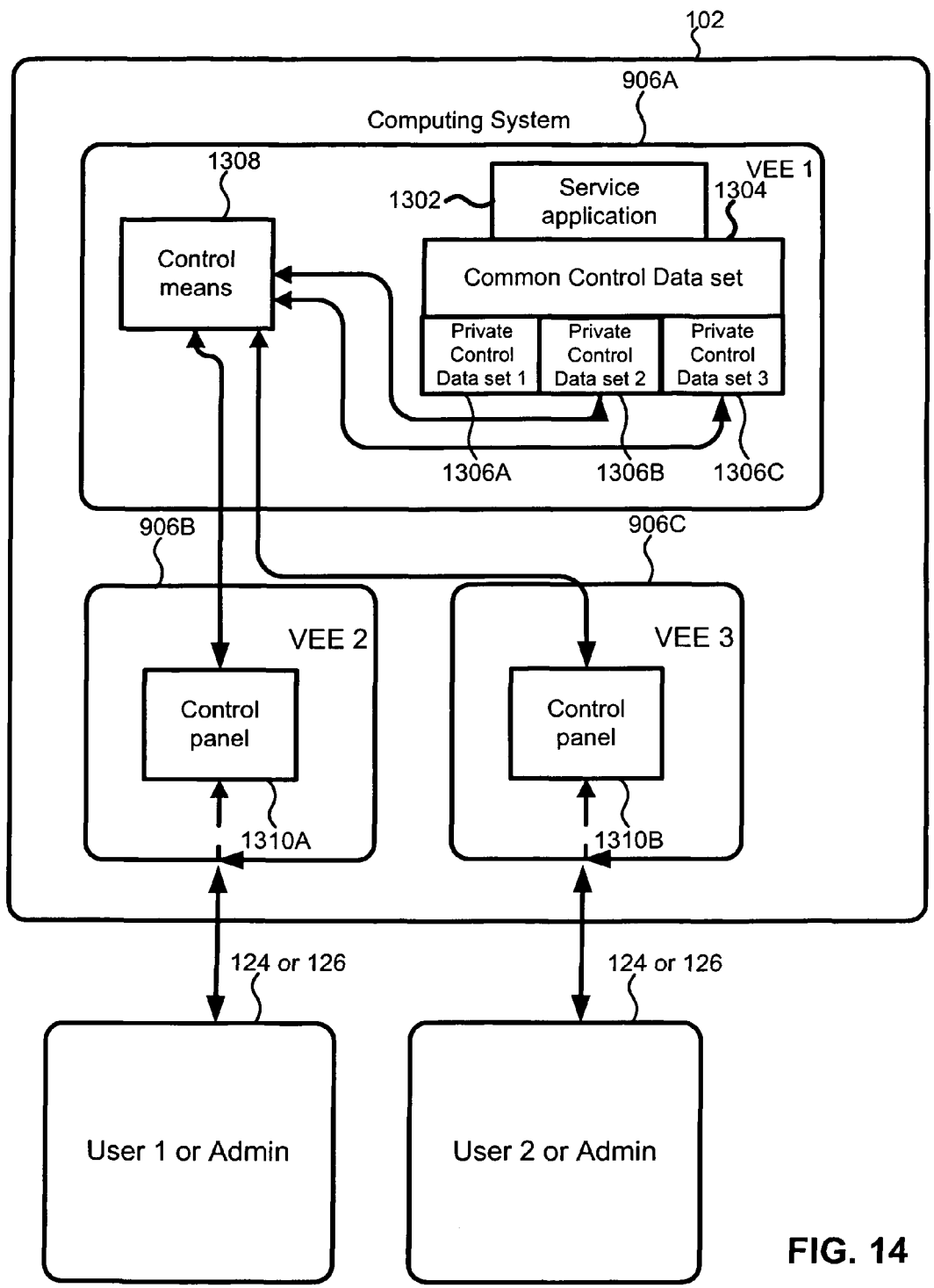
FIG. 14 illustrates an exemplary embodiment where a designated VEE runs the service application and provides services to several other VEEs.

The embodiment providing a more efficient and effective system for control and administration of service applications in Virtual Execution Environment is illustrated in FIG. 14. Multiple VEEs run on the computer system 102. VM (or, alternatively, VPS) 906A is designated to provide security services to VMs 906B and 906C. Service application 1302 runs on VM 906A and is being controlled by control means 1308 residing on VM 906A. Each of the VMs 906B and 906C has its own control panel 1310A and 1310B, which are functionally coupled to the control means 1308 of VM 906A.

This arrangement allows users 124 and administrators 126 of each of the VMs to control and administer the service application 1302 running on the dedicated VM 906 via the control panels 1310A and 1310B of the VMs 906B and 906C respectively. Thus, security service applications are provided to the remote users according to the specific security settings—private control data sets 1306A-1306C residing on the dedicated VM 906A. The operational overhead of control and administration process is significantly minimized by not only running one common instance of the security application on dedicated VM, but also by having common control data sets 1304 and private control data sets 1306A-1306C also reside on the dedicated VM 906A.

In alternative implementations, two or more dedicated VEEs running on different computer systems can provide services to other VEEs running on multiple computer systems arranged in a cluster. The dedicated VEEs act as real servers and provide services to the other VEEs acting as real clients. For example, the dedicated server-type VEE can intercept or filter a flow of IP packets and check the content of these packets for malicious code or unwanted data. The security services are run with the support of the dedicated server-type VEEs as if they were local services for the client-type VEEs. For example, all the client-type VEEs have their own administrative/security functions and security settings, but the applications that perform these functions run in the dedicated server-type VEEs. The users and administrators of the client-type VEEs can control and administer services provided by the dedicated server-type VEEs via the control panels of the client-type VEEs.

Another embodiment is focused on dedication of one or more VEEs for processing network data and, more particularly, to handling network traffic (i.e., packetized data). With respect to handling the network traffic, a generic conventional network interface (i.e., adapter) can be implemented on each of the host computer systems for processing traffic from a LAN and/or a Wide Area Network. The traffic handling rules and policies in this case are the same for all of the VEEs running on the host computer or server.

Figure 15:
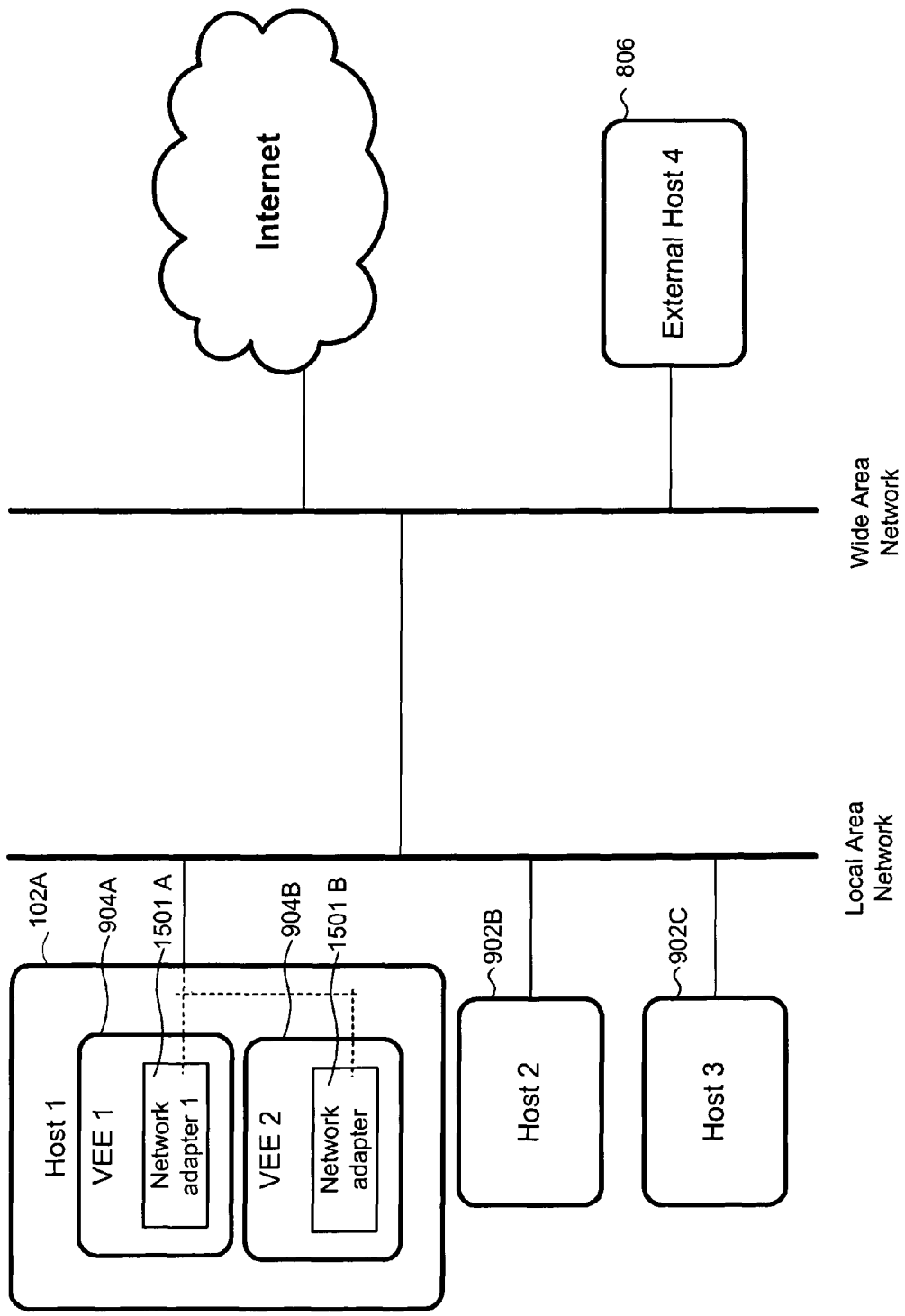
FIG. 15 illustrates an exemplary infrastructure in the context of the Virtual Execution Environment (VEE) with a different virtual network adapter application being implemented within each of the VEEs.

There is also an obvious need to provide network traffic handling services based on specific needs of the individual VEE running on the host server. An exemplary system for providing different network traffic handling services to each of the VEEs running on the same host server is illustrated in FIG. 15. The host server 102A has VEEs 904A and 904B running on its host OS. VEEs 904A and 904B have their own virtual network adapters 1501A and 1501B respectively. The virtual network adapters 1501A and 1501B can have different traffic handling rules and policies according to the needs of their respective VEEs 904A and 904B. This network traffic handling arrangement, while providing advantages over the conventional single network adapter implemented on the host server, suffers from the significant operational overhead caused by the need to run a number of network traffic handling applications on the same host server.

Figure 16:
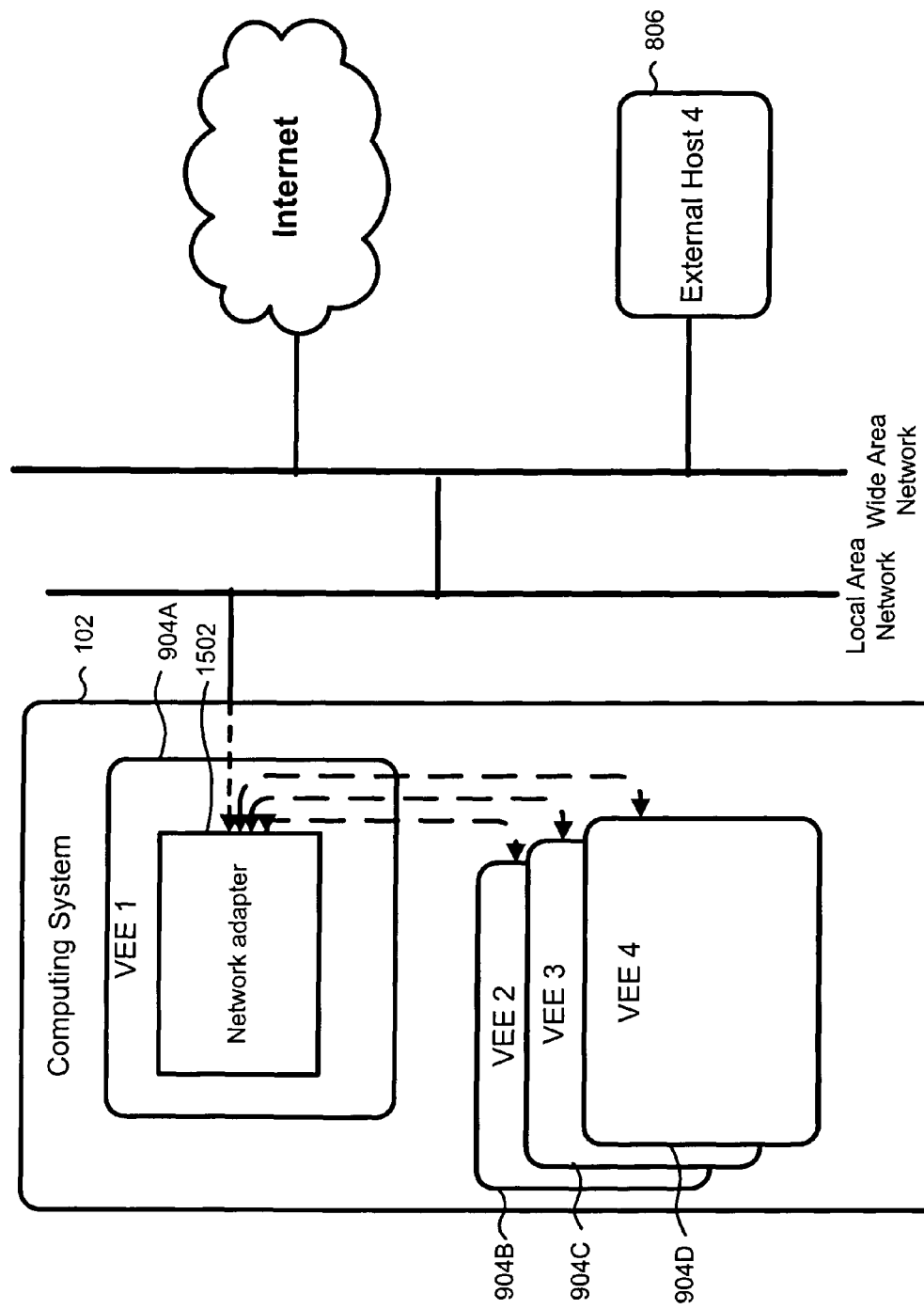
FIG. 16 illustrates an exemplary embodiment where a designated VEE runs the virtual network adapter application and provides the network traffic handling services to several other VEEs.

According to the preferred embodiment, this problem is solved by dedication of one or more VEEs to providing the network traffic handling services to other VEEs, as illustrated in FIG. 16. The server 102 has, for example, four VEEs running on it. The VEEs 904A-904D can be VMs or VEs (VPSs), all of which require network traffic handling services. The virtual network adapter application 1502 runs only within dedicated VEE 904A and provides network traffic handling services to other VEEs 904B-904D running under the host OS of the server 102. The virtual network adapter application 1502 executed within VEE 904A provides traffic handling services to the VEEs 904B-904D according to the private security data set, such as, for example, ID data, logins, passwords, private keys, access rights, access rules and so on. of each of the VEEs. Thus, VEEs 904B-904D can efficiently exchange packetized data with other host servers within LAN and with external servers 806 located on Wide Area Network.

This arrangement for network traffic handling allows users and administrators of each of the VEEs to control and administer the virtual network adapter application 1502 running on the dedicated VEE 904A via the control panels of the VEEs 904B-904D respectively. The network adapter applications can be provided to the remote users according to the specific security settings (i.e., network traffic handling rules and policies)—private control data sets residing on the dedicated VEE 904A. The common control data sets (i.e. network traffic handling rules and policies for the host server) can also be located on the dedicated VEE 904A. Note that network traffic handling rules and policies can be determined according to the requirements of a particular VEE user or by the VEE itself. As one option, a combination of the user-specific parameters and the VEE-specific parameters can be used for application of the network traffic handling rules and policies, such as permitted ports and sockets, private keys and signatures, access rights, access rules and so on.

As another embodiment, the dedicated VEE can be an application server, or can contain an application server, which is a server that is designed for or dedicated to running specific applications. Also the application server may be used to run one application. If that application is used by many VEEs running the application, the other VEEs do not need to dedicate RAM and ROM resources to this.

A single app server typically can run more than one application inside a single server instance. This permits efficient sharing of data/libraries/code between different instances of applications running in a single instance of app server, which is typically more efficient than running many instances of application servers (one per application instance). Typically the operating system cannot provide any memory and other resources sharing between multiple independent application servers, even if they run same applications. This occurs because of dynamic code generation (native code generation, binary translation of byte code and other codes, JIT—"Just in time" compilation and other technologies used inside application servers support means). A single instance of application server can implement own "application-based" and/or user-based rules and policies regarding resources distribution and control. This is analogous to a Service Level Agreement, but is much more efficient than other implementations and can introduce additional SLA parameters for internal application server resources. This typically involve special isolation means of different instances of application inside the application server, and also requires a mechanism for ensuring that each application runs in an "external" context that belongs to the originator of request, not to the application server instance only.

Another possibility is an application server that is used to run certain kinds of applications. For example, many VPSs may require execution of word processing or desktop publishing programs, and those applications may require one server configuration. This can also be implemented by execution applications on one VEE.

The main advantage of software application server (i.e., a dedicated VEE) compared to a hardware application server is that several servers may run on one hardware, and software servers, such as VEEs, provide required security level by isolation the application execution environment from processes of other servers. Since a user of a VPS/VEE is not aware that the application server may be used along with certain VPS/VEE, it is better to provide the application server usage by external or system means. Examples of such application servers are, for example, Java application server, .NET Framework, Appaserver, Base4 or Zope.

The operational overhead of control and administration process, according to the preferred embodiment, is significantly minimized by not only running one common instance of the virtual network adapter application on the dedicated VEE 904A, but also by having the common control data sets and the private control data sets reside on the dedicated VEE 904A.

Figure 17:
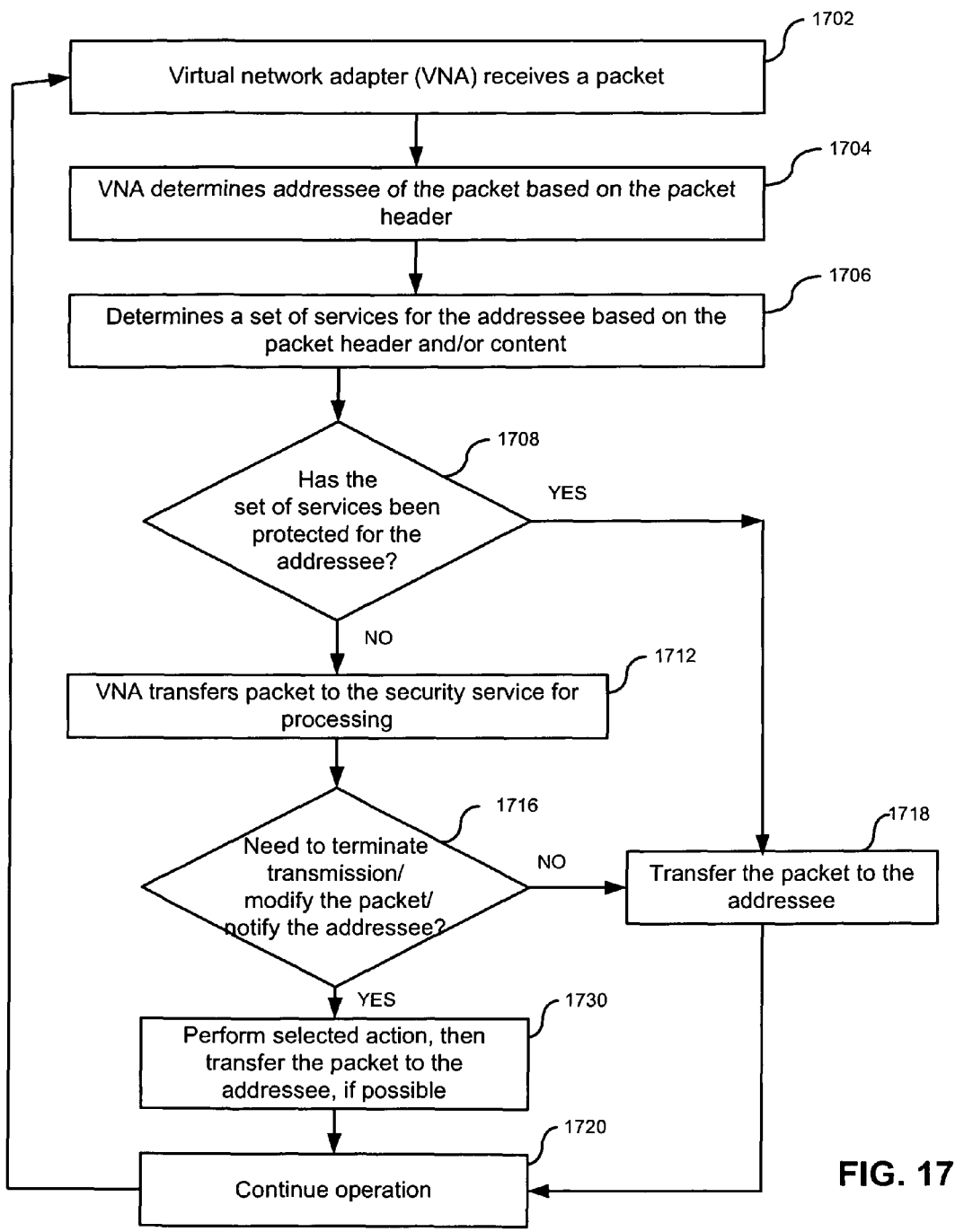
FIG. 17 illustrates a flowchart of traffic handling preformed by a virtual network adapter, in accordance with an exemplary embodiment.

A functionality of a virtual network adapter, according to the preferred embodiment, is illustrated by a flowchart depicted in FIG. 17. A virtual network adapter implemented within a dedicated VEE receives an IP packet in step 1702. The virtual network adapter determines the addressee of the packet based on the packet header (see step 1704). Then, in step 1706, the virtual network adapter defines the set of services for the addressee based on the information contained in the packet header and/or the content of the packet. The virtual network adapter determines, in step 1708, if the set of services defined in step 1706 has been protected for this addressee. If the set of services has been protected, then the packet is transferred to the addressee in step 1718. If the set of services defined in step 1706 has not been protected for the addressee, the packet is transferred, in step 1712, to the security service for processing. If the security service determines, in step 1716, that packet transmission needs to be terminated, or packet needs to be modified, or packet addressee needs to be notified, then the needed action is performed in step 1730 and the packet is transferred to the addressee (if possible) and the operation of the virtual network adapter is continued in step 1720. Otherwise, if it is determined in step 1716 that no action is needed for the packet, the packet is transferred to the addressee, in step 1718, and the virtual network adapter continues its operation (see step 1720).

In one embodiment, only selected traffic can be routed through the virtual network adapter. Optionally, only the incoming traffic can be routed to the virtual network adapter. As a further option, only the traffic bound to the particular VEEs can be routed to the virtual network adapter. As yet a further option, the traffic handling rules can be different for the incoming and for the outgoing traffic. The virtual network adapter can be implemented as a bridge adapter that can be, optionally, invisible or visible to the internal network.

In one embodiment, the virtual network adapter can include security applications, such as, for example, spam filtering, anti-virus and firewall applications discussed above. The virtual network adapter, according to the preferred embodiment, can quarantine any of the VEEs implemented on the same server in case of an emergency such as, for example detection of viruses or a denial-of-service attack.

In yet another embodiment, a number of the computer systems can be arranged into a cluster. Each node of the cluster can have VEEs running on it. In this case, designated VEEs that have virtual network adapters implemented within them can provide network traffic handling services to other VEEs running on the different nodes of the cluster.

Having thus described the different embodiments of a system and method, it should be apparent to those skilled in the art that certain advantages of the described method and system have been achieved. In particular, it should be appreciated by those skilled in the art that network traffic management system described in the preferred embodiment significantly reduces operational overhead and associated costs, while increases the overall security and stability of the computers systems.

It should also be appreciated that various modifications, adaptations, and alternative embodiments thereof may be made within the scope and spirit of the present invention. The invention is further defined by the following claims.

What is claimed is:

1. A system for handling network traffic comprising:
    a computer system having a processor and a memory;
    an operating system (OS) running on the computer system;
    a plurality of Virtual Execution Environments (VEEs) running under the OS, wherein the VEEs provide services to a plurality of remote users;
    at least one designated VEE operationally coupled to other VEEs of the plurality of the VEEs and providing network traffic handling services to the other VEEs, wherein the designated VEE is separate from the OS;
    a virtual network adapter running within the designated VEE and processing the network traffic; and
    common control means integrated within the designated VEE operationally coupled to control means of each of the other VEEs for providing administration of the network traffic handling services to each of the VEEs using private control data sets of each VEE.

2. The system of claim 1, wherein the VEE is any of a Virtual Private Server, a Virtual Machine, a Hypervisor-based Virtual Machine, a session of Windows Terminal Server, and a session of Citrix Presentation Server.

3. The system of claim 1, wherein the virtual network adapter processes network traffic based on pre-set rules and policies.

4. The system of claim 1, wherein the designated VEE provides network traffic handling services to the plurality of the VEEs that are running on a computer cluster.

5. The system of claim 1, wherein the virtual network adapter includes any of:
    a spam filtering application, and
    an anti-virus protection application.

6. The system of claim 1, wherein the virtual network adapter includes security services comprising:
    filtering network traffic based on user-specific parameters only;
    filtering network traffic based on VEE-specific parameters only; and
    filtering network traffic based on a combination of the user-specific parameters and the VEE-specific parameters.

7. The system of claim 1, wherein the control means provide a selection of the network traffic handling rules and policies based on the private control data sets of each VEE; and wherein the private control data sets comprise the traffic handling rules and policies specific to each remote user of each VEE.

8. A method for handling network traffic comprising:
launching a plurality of Virtual Execution Environments (VEEs) on a computer system;
designating one of the VEEs for providing network traffic handling services to the other VEEs, wherein the designated VEE is separate from an operating system of the computer system;
activating a virtual network adapter within the designated VEE for processing the network traffic; and
controlling deployment of the network traffic handling services by the designated VEE using private control data sets specific to each of the VEEs,
wherein the designated VEE is operationally coupled to each of the VEEs through common VEE integrated control means for providing administration of the network traffic handling services to each of the VEEs using private control data sets of each VEE.

9. The method of claim 8, wherein the VEE is any of a Virtual Private Server, a Virtual Machine, a Hypervisor-based Virtual Machine, a session of Windows Terminal Server, and a session of Citrix Presentation Server.

10. The method of claim 8, wherein the designated VEE provides network traffic handling services to the plurality of VEEs running on a plurality of computer systems.

11. The method of claim 8, wherein the virtual network adapter includes any of:
a spam filtering application, and
an anti-virus protection application.

12. The method of claim 8, wherein the virtual network adapter includes security services comprising:
filtering network traffic based on user-specific parameters only;
filtering network traffic based on VEE-specific parameters only; and
filtering network traffic based on a combination of the user-specific parameters and the VEE-specific parameters.

13. The method of claim 8, wherein the private control data sets comprise traffic handling rules and policies specific to each remote user of the VEE.

14. A system for handling network traffic comprising:
a computer cluster having a plurality of nodes, wherein each node has a processor and a memory;
an operating system running on each node of the cluster;
a plurality of Virtual Execution Environments (VEEs) running on each node, wherein the VEEs provide services to a plurality of remote users, and wherein the designated VEE is separate from an operating system of the computer system of its node;
at least two designated VEEs running on different computer systems providing network traffic handling services to other VEEs;
virtual network adapters for processing the network traffic running within the designated VEEs; and
common control means within the designated VEEs and operationally coupled to control means of each of the other VEEs for providing administration of the network traffic handling services to each of the VEEs,
wherein each of the designated VEEs provides a different network traffic handling service to the other VEEs; and
wherein the virtual network adapters includes at least one of spam filtering application and anti-virus protection application.

15. The system of claim 14, wherein the VEEs comprise VPSs.

16. The system of claim 14, wherein the VEEs comprise VMs.

17. A system for handling user applications comprising:
a computer system having a processor and a memory;
an operating system (OS) running on the computer system;
a plurality of Virtual Execution Environments (VEEs) running under the OS, wherein the VEEs provide services to a plurality of remote users;
at least one VEE designated as an application server for providing services to the other VEEs, wherein the designated VEE is separate from the OS; and
common control means integrated within the designated VEE operationally coupled to control means of each of the other VEEs for providing communication from the application server to each of the VEEs and from the VEEs to the application server;
wherein invocation, inside one of the VEEs, for executing an application is redirected to the designated VEE for starting and running the application inside the designated VEE;
wherein the application runs in a context of the designated VEE; and
the application communicates with the VEE from which it was invoked using a virtual network adapter.

18. The system of claim 17, wherein the application server is Java application server, .NET Framework, Appserver, Base4 or Zope.

19. The system of claim 17, wherein the context of the designated VEE comprises any of:
local VEE files;
the VEE settings;
inter process communication means with the local process of the VEE;
the VEE network addresses and ports.

20. The method of claim 1, wherein the common control means uses common control parameters for administration of the VEEs.

* * * * *